US012177777B2

(12) United States Patent
Ye et al.

(10) Patent No.: US 12,177,777 B2
(45) Date of Patent: Dec. 24, 2024

(54) CROSS-SLOT SCHEDULING POWER SAVING TECHNIQUES

(71) Applicant: Apple Inc., Cupertino, CA (US)

(72) Inventors: Qiaoyang Ye, Fremont, CA (US); Hong He, San Jose, CA (US); Toufiqul Islam, Santa Clara, CA (US); Gregory Ermolaev, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 402 days.

(21) Appl. No.: 17/442,906

(22) PCT Filed: Apr. 2, 2020

(86) PCT No.: PCT/US2020/026448
§ 371 (c)(1),
(2) Date: Sep. 24, 2021

(87) PCT Pub. No.: WO2020/206164
PCT Pub. Date: Oct. 8, 2020

(65) Prior Publication Data
US 2022/0210736 A1 Jun. 30, 2022

Related U.S. Application Data

(60) Provisional application No. 62/828,327, filed on Apr. 2, 2019.

(51) Int. Cl.
H04W 52/02 (2009.01)
H04L 5/00 (2006.01)
(Continued)

(52) U.S. Cl.
CPC ....... H04W 52/0216 (2013.01); H04L 5/0091 (2013.01); H04L 41/0803 (2013.01);
(Continued)

(58) Field of Classification Search
CPC ......... H04W 52/0216; H04W 52/0235; H04W 52/0206; H04W 52/0229; H04W 72/1273;
(Continued)

(56) References Cited

U.S. PATENT DOCUMENTS 7,952,565 B2   5/2011  Park et al.
8,175,109 B2   5/2012  Nogueira-Nine
(Continued)

FOREIGN PATENT DOCUMENTS

CN   101702823   5/2010
CN   103636264   3/2014
(Continued)

OTHER PUBLICATIONS

[No Author Listed], "3rd Generation Partnership Project; Technical Specification Group Radio Access Network; NR; Multiplexing and channel coding (Release 16)," 3GPP TS 38.212, V 16.0.0, Table 7.3.1.1.2-1 of 3GPP TS 38.212, Dec. 2019, 152 pages.
(Continued)

Primary Examiner — Candal Elpenord
(74) Attorney, Agent, or Firm — Fish & Richardson P.C.

(57) ABSTRACT

Methods, systems, apparatus, and computer programs, for activating cross-slot scheduling in user equipment (UE) to achieve power savings. In one aspect, the method can include actions of generating, by an access node, an RRC communication including one or more parameters that, when processed by the UE, configures the UE to forego use of computing resources to buffer for potential PDSCH transmission for a predetermined amount of time, encoding, by the access node, the RRC communication for transmission to the UE, and causing, by the access node, one or more antennae to transmit the encoded RRC communication to the UE.

20 Claims, 17 Drawing Sheets

(51) Int. Cl.
*H04L 41/0803* (2022.01)
*H04W 72/12* (2023.01)
*H04W 72/1273* (2023.01)
*H04W 76/28* (2018.01)

(52) U.S. Cl.
CPC ... *H04W 52/0235* (2013.01); *H04W 72/1273* (2013.01); *H04W 76/28* (2018.02)

(58) Field of Classification Search
CPC .. H04W 72/23; H04W 76/28; H04L 41/0803; H04L 5/0091; H04L 5/0044; H04L 5/0053; Y02D 30/70
USPC .......................................................... 370/254
See application file for complete search history.

(56) References Cited

U.S. PATENT DOCUMENTS

| | | | |
|---|---|---|---|
| 8,600,379 B2 | 12/2013 | Kim | |
| 8,724,536 B2 | 5/2014 | Gao et al. | |
| 8,774,138 B2 | 7/2014 | Ramos et al. | |
| 9,872,252 B1 | 1/2018 | Ang et al. | |
| 9,986,452 B2 | 5/2018 | Liu et al. | |
| 10,004,099 B2 | 6/2018 | Johansson et al. | |
| 10,159,109 B2 | 12/2018 | Kanesalingam et al. | |
| 10,211,838 B2 | 2/2019 | Liu et al. | |
| 10,285,129 B2 | 5/2019 | Song et al. | |
| 10,425,199 B2 | 9/2019 | Chen et al. | |
| 10,594,468 B2 | 3/2020 | Liao et al. | |
| 10,743,257 B2 | 8/2020 | Liu et al. | |
| 10,805,979 B2 | 10/2020 | Chakraborty et al. | |
| 10,863,436 B2 | 12/2020 | Jeong et al. | |
| 10,966,155 B1 | 3/2021 | Kasslin et al. | |
| 10,986,572 B2 | 4/2021 | Gan et al. | |
| 11,013,018 B2 | 5/2021 | Shi et al. | |
| 11,032,047 B2 | 6/2021 | Liu et al. | |
| 11,076,381 B2 | 7/2021 | Bhatoolaul et al. | |
| 11,089,549 B2 | 8/2021 | Nam et al. | |
| 11,089,570 B2 | 8/2021 | Yi et al. | |
| 11,284,477 B2 | 3/2022 | Islam et al. | |
| 11,356,949 B2 | 6/2022 | Xu | |
| 11,363,668 B2 | 6/2022 | Tang | |
| 11,388,669 B2 | 7/2022 | Medles et al. | |
| 11,483,768 B2 | 10/2022 | He | |
| 11,483,866 B2 | 10/2022 | Myung et al. | |
| 11,490,334 B2 | 11/2022 | Zhou et al. | |
| 11,503,639 B2 | 11/2022 | Myung et al. | |
| 11,516,737 B2 | 11/2022 | Kim et al. | |
| 11,553,430 B2 | 1/2023 | Kwon et al. | |
| 11,564,166 B2 | 1/2023 | Nam et al. | |
| 11,564,282 B2 | 1/2023 | Jiang et al. | |
| 11,606,751 B2 | 3/2023 | Lee et al. | |
| 11,647,464 B2 | 5/2023 | Reial et al. | |
| 11,722,916 B2 | 8/2023 | Xia et al. | |
| 11,729,810 B2 | 8/2023 | Xia et al. | |
| 11,729,857 B2 | 8/2023 | Islam et al. | |
| 12,022,393 B2 | 6/2024 | Ye et al. | |
| 2012/0275366 A1 | 11/2012 | Anderson et al. | |
| 2013/0215853 A1 | 8/2013 | Li et al. | |
| 2015/0195780 A1 | 7/2015 | Liu | |
| 2015/0208462 A1 | 7/2015 | Lee et al. | |
| 2015/0230180 A1 | 8/2015 | Lim et al. | |
| 2016/0286603 A1 | 9/2016 | Vajapeyam et al. | |
| 2016/0373233 A1 | 12/2016 | Pelletier et al. | |
| 2018/0027927 A1 | 2/2018 | Fisher et al. | |
| 2018/0077688 A1 | 3/2018 | Yi et al. | |
| 2018/0084501 A1 | 3/2018 | Mu et al. | |
| 2018/0279274 A1 | 9/2018 | Sun et al. | |
| 2018/0332655 A1 | 11/2018 | Ang et al. | |
| 2019/0090299 A1 | 3/2019 | Ang et al. | |
| 2019/0254110 A1 | 8/2019 | He et al. | |
| 2020/0027529 A1 | 1/2020 | Mitani et al. | |
| 2020/0029315 A1 | 1/2020 | Lin et al. | |
| 2020/0037247 A1 | 1/2020 | Liao et al. | |
| 2020/0037396 A1 | 1/2020 | Cheng et al. | |
| 2020/0092073 A1 | 3/2020 | Papasakellariou et al. | |
| 2020/0092813 A1 | 3/2020 | Kim et al. | |
| 2020/0221384 A1 | 7/2020 | Ang et al. | |
| 2020/0275296 A1 | 8/2020 | Chen et al. | |
| 2020/0314747 A1* | 10/2020 | Zhou | H04L 5/0053 |
| 2020/0314811 A1* | 10/2020 | Lin | H04W 52/0235 |
| 2020/0314816 A1* | 10/2020 | Yi | H04W 28/0236 |
| 2020/0337038 A1 | 10/2020 | Takeda et al. | |
| 2020/0367193 A1 | 11/2020 | Cha et al. | |
| 2021/0092751 A1* | 3/2021 | Jiang | H04W 76/27 |
| 2021/0168781 A1 | 6/2021 | Lee et al. | |
| 2021/0176710 A1 | 6/2021 | Tooher et al. | |
| 2021/0195521 A1 | 6/2021 | Muller et al. | |
| 2021/0259044 A1 | 8/2021 | Islam et al. | |
| 2021/0289441 A1* | 9/2021 | Li | H04W 52/0216 |
| 2021/0314866 A1 | 10/2021 | Lee et al. | |
| 2021/0321333 A1 | 10/2021 | Miao | |
| 2021/0321446 A1* | 10/2021 | Lee | H04W 72/0446 |
| 2021/0345124 A1 | 11/2021 | Myung et al. | |
| 2021/0360532 A1* | 11/2021 | Jiang | H04W 52/0229 |
| 2021/0368438 A1 | 11/2021 | Li et al. | |
| 2021/0368444 A1 | 11/2021 | Wang et al. | |
| 2022/0007408 A1 | 1/2022 | Xu | |
| 2022/0022137 A1* | 1/2022 | Xue | H04W 24/08 |
| 2022/0086756 A1 | 3/2022 | Reial et al. | |
| 2022/0116875 A1 | 4/2022 | Nimbalker et al. | |
| 2022/0174137 A1* | 6/2022 | Lee | H01Q 1/24 |
| 2022/0182938 A1* | 6/2022 | Ye | H04W 52/0232 |
| 2022/0217579 A1* | 7/2022 | Seo | H04L 1/1896 |
| 2023/0145663 A1 | 5/2023 | Kwon et al. | |
| 2023/0389125 A1 | 11/2023 | Islam et al. | |

FOREIGN PATENT DOCUMENTS

| | | |
|---|---|---|
| CN | 104365164 | 2/2015 |
| KR | 10-2018-0020168 | 2/2018 |
| WO | WO 2015018045 | 2/2015 |
| WO | WO 2018132100 | 7/2018 |
| WO | WO 2018175760 | 9/2018 |
| WO | WO 2019030335 | 2/2019 |

OTHER PUBLICATIONS

[No Author Listed], "5G; NR; Medium Access Control (MAC) protocol specification (3GPP TS 38.321 version 16.1.0 Release 16)," ETSI TS 1 38.231, V 16.1.0, Jul. 2020, 153 pages.

[No Author Listed], "5G; NR; Physical channels and modulation (3GPP TS 38.211 version 16.2.0 Release 16)," ETSI TS 1 38.211, V 16.2.0, subclause 6.4.1.1.3 of 3GPP TS 38.211, Jul. 2020, 136 pages.

[No Author Listed], "5G; NR; Physical channels and modulation (3GPP TS 38.211 version 16.2.0 Release 16)," ETSI TS 1 38.211, V 16.2.0, Subclause 7.4.1.1.2 of 3GPP TS 38.211, Jul. 2020, 136 pages.

[No Author Listed], "5G; NR; Physical layer procedures for control (3GPP TS 38.213 version 15.3.0 Release 15)," ETSI TS 1 38.213, V 15.3.0, Subclause 9.2.3 of 3GPP TS 38.213, Oct. 2018, 102 pages.

[No Author Listed], "5G; NR; Physical layer procedures for control (3GPP TS 38.213 version 16.2.0 Release 16)," ETSI TS 1 28.213, V 16.2.0, Subclause 11.1 of 3GPP TS 38.213, Jul. 2020, 180 pages.

[No Author Listed], "5G; NR; Physical layer procedures for data (3GPP TS 38.214 version 15.3.0 Release 15)," ETSI TS 1 38.214, V 15.3.0, Subclause 6.1.2.1.1 of 3PP TS 38.214, Oct. 2018, 99 pages.

[No Author Listed], "5G; NR; Physical layer procedures for data (3GPP TS 38.214 version 15.3.0 Release 15)," ETSI TS 1 38.214, V15.3.0, Subclause 5.1.2.1.1 of 3GPP TS 38.214, Oct. 2018, 99 pages.

[No Author Listed], "5G; NR; Physical layer procedures for data (3GPP TS 38.214 version 16.2.0 Release 16)," ETSI TS 1 38.214, V 16.2.0, Jul. 2020, 167 pages.

Apple Inc., "Power Saving Techniques based on UE Adaptation," 3GPP TSG-RAN WG1 Meeting Ad-Hoc 1901, R1-1900753, Taipei, Taiwan, Jan. 21-25, 2019, 12 pages.

(56) References Cited

OTHER PUBLICATIONS

Ericsson, "DRX with short on-Duration and Wake-up signaling," R2-1811627, 3GPP TSG-RAN WG2 #103, Gothenburg, Sweden, Aug. 20-24, 2018, 3 pages.

Ericsson, "Techniques for UE Power Saving," 3GPP TSG-RAN WG1 Meeting #96, Tdoc R1-1902935, Athens, Greece, Feb. 25-Mar. 1, 2019, 15 pages.

Ericsson, "Triggers for NR UE power saving," 3GPP TSG-RAN WG1 Meeting AH-1901, Tdoc R1-1901167, Taipei, Taiwan, Jan. 21-25, 2019, 13 pages.

Ericsson, "Wake-up signal configurations and procedures for NB-IoT," R1-1805855, 3GPP TSG RAN WG1 Meeting #93, Busan, Korea, May 20-24, 2018, 9 pages.

International Preliminary Report on Patentability in International Appln. No. PCT/US2020/026448, dated Oct. 14, 2021, 12 pages.

International Search Report and Written Opinion in International Appln. No. PCT/US2020/026448, Sep. 17, 2020, 20 pages.

Invitation to Pay Additional Fees in International Appln. No. PCT/US2020/026448, dated Jul. 27, 2020, 15 pages.

Qualcomm Incorporated, "Efficient monitoring of DL control channels," R1-1804914, 3GPP TSG RAN WG1 Meeting #92bis, Sanya, China, Apr. 16-20, 2018, 13 pages.

Qualcomm Incorporated, "Potential Techniques for UE Power Saving," 3GPP TSG-RAN WG1 #96, R1-1903016, Athens, Greece, Feb. 25-Mar. 1, 2019, 33 pages.

Qualcomm Incorporated, "Triggering Adaptation of UE Power Consumption Characteristics," 3GPP TSG-RAN WG1 Meeting #94bis, R101811283, Chengdu, China, Oct. 8-12, 2018, 12 pages.

ZTE, "Evaluation results of UE power consumption," 3GPP TSG RAN WG1 Meeting #96, R1-1902030, Athens, Greece, Feb. 25-Mar. 1, 2019, 17 pages.

[No Author Listed], "3rd Generation Partnership Project; Technical Specification Group Radio Access Network; NR; Study on UE Power Saving (Release 16)," 3GPP TR 38.840 V0.1.1, Feb. 2019, 34 pages.

Catt et al., "New WID: UE Power Saving in NR," 3GPP TSG RAN Meetings #83 RP-190727, Shenzhen, China, Mar. 18-21, 2019, 5 pages.

* cited by examiner

| | Oct 1 | Oct 2 | Oct 3 | Oct 4 |
|---|---|---|---|---|
| | R | $C_8$ | $C_{16}$ | $C_{24}$ |
| | $C_1$ | $C_9$ | $C_{17}$ | $C_{25}$ |
| | $C_2$ | $C_{10}$ | $C_{18}$ | $C_{26}$ |
| | $C_3$ | $C_{11}$ | $C_{19}$ | $C_{27}$ |
| | $C_4$ | $C_{12}$ | $C_{20}$ | $C_{28}$ |
| | $C_5$ | $C_{13}$ | $C_{21}$ | $C_{29}$ |
| | $C_6$ | $C_{14}$ | $C_{22}$ | $C_{30}$ |
| | $C_7$ | $C_{15}$ | $C_{23}$ | $C_{31}$ |

FIG. 14

CROSS-SLOT SCHEDULING POWER SAVING TECHNIQUES

CROSS-REFERENCE TO RELATED APPLICATIONS

This application is a national phase entry under 35 U.S.C. § 371 of International Application No. PCT/US2020/026448, filed on Apr. 2, 2020, entitled "CROSS-SLOT SCHEDULING POWER SAVING TECHNIQUES," which claims the benefit of U.S. Provisional Patent Application No. 62/828,327 filed Apr. 2, 2019, the entirety of all which are incorporated herein by reference.

BACKGROUND

Various embodiments generally may relate to the field of wireless communications. In particular, aspects of the present disclosure relate to reducing User Equipment (UE) power consumption and improving UE battery life.

SUMMARY

According to one innovated aspect of the present disclosure, a method for activating cross-slot scheduling in user equipment (UE) to achieve power savings is disclosed. In one aspect, the method can include actions of generating, by an access node, an RRC communication including one or more parameters that, when processed by the UE, configures the UE to forego use of computing resources to buffer for potential PDSCH transmission for a predetermined amount of time, encoding, by the access node, the RRC communication for transmission to the UE, and causing, by the access node, one or more antennae to transmit the encoded RRC communication to the UE.

Other versions include corresponding systems, apparatus, and computer programs to perform the actions of methods defined by instructions encoded on computer readable storage devices.

These and other versions may optionally include one or more of the following features. For instance, in some implementations, foregoing use of computing resources to buffer for potential PDSCH transmission for a predetermined amount of time can include causing the UE to switch to micro sleep mode after PDCCH reception.

In some implementations, the predetermined amount time can include a period of time while the PDCCH is being decoded by the UE.

In some implementations, the predetermined amount of time is defined by a timer on the UE.

In some implementations, the one or more parameters of the RRC communication can include data that can be used to configure a time domain resource allocation (TDRA) table, and configuring the UE to forego use of the computing resources to buffer for potential PDSCH transmission for a predetermined amount of time can include assigning one or more fields of the TDRA table based on the one or more parameters of the RRC communication.

In some implementations, one or more parameters of the RRC communication can include a list of data including (i) a slot offset k0 that is greater than 0 or k2 that is greater than 0 and (ii) a start and length indicator (SLTV) that can be used to configure a TDRA table, and configuring the UE to forego use of the computing resources to buffer for potential PDSCH transmission for a predetermined amount of time can include assigning one or more fields of the TDRA table based on the list of data included in the RRC communication.

In some implementations, the access node is an eNodeB.

According to another innovative aspect of the present disclosure, a method for activating cross-slot scheduling in user equipment (UE) to achieve power savings is disclosed. In one aspect, the method can include actions of generating, by an access node, a system information communication including one or more parameters that, when processed by the UE, configures the UE to forego use of computing resources to buffer for potential PDSCH transmission for a predetermined amount of time, encoding, by the access node, the system information communication for transmission to the UE, causing, by the access node, one or more antennae to transmit the encoded system information communication to the UE.

Other versions include corresponding systems, apparatus, and computer programs to perform the actions of methods defined by instructions encoded on computer readable storage devices.

These and other versions may optionally include one or more of the following features. For instance, in some implementations, foregoing use of computing resources to buffer for potential PDSCH transmission for a predetermined amount of time can include causing the UE to switch to micro sleep mode after PDCCH reception.

In some implementations, the predetermined amount time can include a period of time while the PDCCH is being decoded by the UE.

In some implementations, the predetermined amount of time is defined by a timer on the UE.

In some implementations, the one or more parameters of the system information communication can include data that can be used to configure a time domain resource allocation (TDRA) table, and configuring the UE to forego use of the computing resources to buffer for potential PDSCH transmission for a predetermined amount of time can include assigning one or more fields of the TDRA table based on the one or more parameters of the system information communication.

In some implementations, the one or more parameters of the system information can include a list of data including (i) a slot offset k0 that is greater than 0 or k2 that is greater than 0 and (ii) a start and length indicator (SLIV) that can be used to configure a TDRA table, and configuring the UE to forego use of the computing resources to buffer for potential PDSCH transmission for a predetermined amount time can include assigning one or more fields of the TDRA table based on the list of data included in the system information communication.

In some implementations, the access node is an eNodeB.

According to another innovative aspect of the present disclosure, a method for activating cross-slot scheduling in user equipment (UE) to achieve power savings is disclosed. In one aspect, the method can include aspects of generating, by an access node, a MAC control element (CE) that provides an indication of activation state information of cross-slot scheduling for each secondary cell (SCell) of multiple SCells, wherein when the MAC CE is processed by the UE, the MAC CE configures the UE to forego use of computing resources to buffer for potential PDSCH transmission for a predetermined period of time based on the activation state information and a current SCell where the UE is located, encoding, by the access node, the MAC CE for transmission to the UE, and causing, by the access node, one or more antenna to transmit the encoded system information communication to the UE.

Other versions include corresponding systems, apparatus, and computer programs to perform the actions of methods defined by instructions encoded on computer readable storage devices.

These and other versions may optionally include one or more of the following features. For instance, in some implementations, the activation state information provides, for each particular SCell of the multiple SCells data indicating whether cross-slot scheduling is activated or deactivated for the particular SCell.

In some implementations, foregoing use of computing resources to buffer for potential PDSCH transmission for a predetermined amount of time can include causing the UE to switch to micro sleep mode after PDCCH reception.

In some implementations, the predetermined amount time can include a period of time while the PDCCH is being decoded by the UE.

In some implementations, the predetermined amount of time is defined by a timer on the UE.

In some implementations, configuring the LE to forego use of the computing resources to buffer for potential PDSCH transmission for a predetermined amount of time can include assigning one or more fields of the TDRA table based on the activation state information of the MAC CE.

In some implementations, the MAC CE is a fixed size.

In some implementations, the MAC CE includes 4 octets.

In some implementations, the MAC CE includes 1 octet, and one bit $C_i$ is used to represent activation state information regarding cross-slot scheduling for all CC(s) within a carrier group (CG).

In some implementations, the access node is an eNodeB.

According to another innovative aspect of the present disclosure, a method for activating cross-slot scheduling in user equipment (UE) to achieve power savings is disclosed. In one aspect, the method includes actions of generating, by an access node, a wake-up PDCCH message that includes a field indicating that cross-slot scheduling is to be activated for the UE and, when processed by the UE, configures the UE to forego use of computing resources to buffer for potential PDSCH transmission for a predetermined amount of time, encoding, by the access node, the wake-up PDCCH message for transmission to the IE, and causing, by the access node, one or more antennae to transmit the encoded wake-up PDCCH message to the UE.

Other versions include corresponding systems, apparatus, and computer programs to perform the actions of methods defined by instructions encoded on computer readable storage devices.

These and other versions may optionally include one or more of the following features. For instance, in some implementations, foregoing use of computing resources to buffer for potential PDSCH transmission for a predetermined amount of time can include causing the UE to switch to micro sleep mode after PDCCH reception.

In some implementations, the predetermined amount time can include a period of time while the PDCCH is being decoded by the UE.

In some implementations, the predetermined amount of time is defined by a timer on the UE.

In some implementations, configuring the UE to forego use of the computing resources to buffer for potential PDSCH transmission for a predetermined amount of time can include assigning one or more fields of a TDRA table based on data in the field of the wake-up PDCCH.

In some implementations, the data in the field of the wake-up PDCCH indicates a subset of rows in one or more TDRA tables, indicates a value of k0 or k2, or indicates a particular TDRA table when multiple of multiple candidate TDRA tables.

In some implementations, the data in the field of the wake-up PDCCH is applied to a BWP or the CC(s) to be woken up by the wake-up PDCCH.

According to another innovative aspect of the present disclosure, a method for achieving power savings in UE is disclosed. In one aspect, the method can include actions of receiving, by the UE, an indication from an access node that causes the UE to activate cross-slot scheduling mode, after activating cross-slot scheduling mode, receiving, by the UE, a PDCCH message, and after receiving the PDCCH message by the UE, foregoing use of computing resources to buffer for potential PDSCH transmission for a predetermined period of time.

Other versions include corresponding systems, apparatus, and computer programs to perform the actions of methods defined by instructions encoded on computer readable storage devices.

These and other versions may optionally include one or more of the following features. For instance, in some implementations, the indication can include an RRC communication including one or more parameters that, when processed by the UE, configures the UE to forego use of computing resources to buffer for potential PDSCH transmission for a predetermined amount of time.

In some implementations, the indication can include a system information communication including one or more parameters that, when processed by the UE, configures the UE to forego use of computing resources to buffer for potential PDSCH transmission for a predetermined amount of time.

In some implementations, the indication can include a MAC control element (CE) that provides an indication of activation state information of cross-slot scheduling for each secondary cell (SCell) of multiple SCells, wherein when the MAC CE is processed by the UE, the MAC CE configures the UE to forego use of computing resources to buffer for potential PDSCH transmission for a predetermined period of time based on the activation state information and a current SCell where the UE is located.

In some implementations, the indication can include a wake-up PDCCH message that includes a field indicating that cross-slot scheduling is to be activated for the UE and, when processed by the UE, configures the UE to forego use of computing resources to buffer for potential PDSCH transmission for a predetermined amount of time.

In some implementations, the method can further include upon a determination, by the UE, that period of time has expired, allocating computing resources to monitor for potential PDSCH messages.

In some implementations, foregoing use of computing resources to buffer for potential PDSCH transmission for a predetermined amount of time can include causing the UE to switch to micro sleep mode after PDCCH reception.

In some implementations, the predetermined amount time can include a period of time while the PDCCH is being decoded by the UE.

In some implementations, the predetermined amount of time is defined by a timer on the UE.

These and other aspects of the present disclosure are discussed in more detail in the detailed description below with reference to the accompanying drawings.

BRIEF DESCRIPTION OF THE DRAWINGS

FIG. 14 is an example of a MAC control element (CE) that can be used to activate cross-slot scheduling in UEs to achieve power savings.

DETAILED DESCRIPTION

The present disclosure is directed towards methods, system, and computer programs for activating cross-slot scheduling on UE in order to achieve UE power savings, thereby extending UE batter life. Cross-slot scheduling in a UE can achieve UE power savings by eliminating the allocation and use of resources by a UE to buffer for potentially incoming PDSCH transmissions after receipt of a PDCCH and while the PDCCH is decoding. Such buffering typically occurs in conventional systems, as it has conventionally been unknown whether the UE is going to receive PDSCH transmissions while the PDCC is being decoded.

However, present disclosure provides implementations that use an access node such as an eNodeB to provide an indication to the UE that activates cross-slot scheduling. This indication informs the UE that the UE should not expect PDSCH transmission until after a predetermined amount of time such as a time k0, k2, or other time set forth in a time domain resource allocation (TDRA) table. In view of this indication, the UE can forego allocating resources to buffer or potential PDSCH transmission and, in some implementations, enter into a low power or micro sleep state that conservers UE battery usage until a later time when the UE expects to receive PDSCH transmission. In some implementations, the indication from the access node can indicate an when PDSCH transmission can be expected such as an offset of k0, k2, or the like from a TDRA table. In other implementations, upon receipt of the indication from the access node, the UE enter the low power or micro sleep state for a predetermined amount time that is measured, for example, based on a UE counter. In such instances, the UE can stay in the low power or micro sleep state until the counter reaches a predetermined time, until the counter expires, or the like. The indication from the access node can be sent using higher layer signaling, MAC CEs, L1 signaling, or using an implicit indication, as described in more detail herein.

Figure 1:
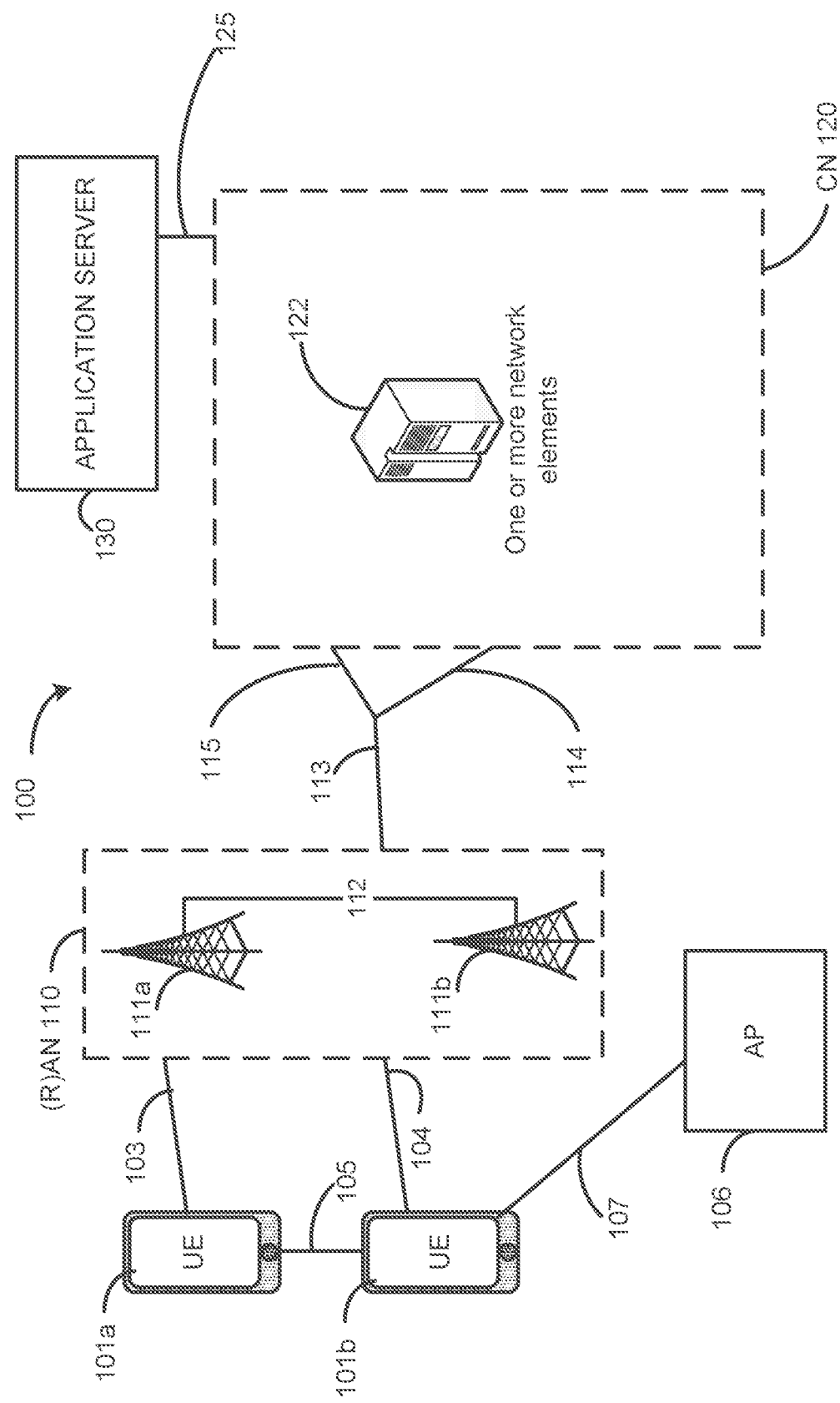
FIG. 1 illustrates an example architecture of a system of a network.

FIG. 1 illustrates an example architecture of a system 100 of a network, according to some implementations of the present disclosure. The following description is provided for an example system 100 that operates in conjunction with the LTE system standards and 5G or NR system standards as provided by 3GPP technical specifications. However, the example implementations are not limited in this regard and the described implementations may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some implementations, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with a RAN 110. In implementations, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In implementations, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various implementations, the UE 101b, RAN 110, and AP 106 may be configured to utilize LWA operation and/or LWIP operation. The LWA operation may involve the UE 101b in RRC_CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various implementations, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some implementations, all or parts of the RAN nodes 111 may be implemented as one or more software entities running on server computers as part of a virtual network, which may be referred to as a CRAN and/or a virtual baseband unit pool (vBBUP). In these implementations, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC (e.g., CN 320 of FIG. 3) via an NG interface (discussed infra).

In V2X scenarios one or more of the RAN nodes 111 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 101 (vUEs 101). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 111 can terminate the air interface protocol and can be the first point of contact for the UEs 101. In some implementations, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In implementations, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the implementations is not limited in this respect. The OFDM signals can comprise a plurality of orthogonal subcarriers.

In some implementations, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various implementations, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms In these implementations, the UFs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. For downlink, a maximum of 16 HARQ processes per cell is supported by the UE 101. The number of processes the UE 101 may assume will at most be used for the downlink is configured to the UE 101 for each cell separately by higher layer parameter nrofHARQ-Processes-ForPDSCH, and when no configuration is provided the UE 101 may assume a default number of 8 processes.

A UE 101, upon detection of a PDCCH with a configured DCI format 1_0 or 1_1, decodes the corresponding PDSCHs as indicated by that DCI. For any HARQ process ID(s) in a given scheduled cell, the UE 101 is not expected to receive a PDSCH that overlaps in time with another PDSCH. The UE 101 is not expected to receive another PDSCH for a given HARQ process until after the end of the expected transmission of HARQ-ACK for that HARQ process, where the timing is given by subclause 9.2.3 of 3GPP TS 38.213. The UE 101 is not expected to receive a first PDSCH in slot i, with the corresponding HARQ-ACK assigned to be transmitted in slot j, and a second PDSCH starting later than the first PDSCH with its corresponding HARQ-ACK assigned to be transmitted in a slot before slot j. For any two HARQ process IDs in a given scheduled cell, if the UE is scheduled to start receiving a first PDSCH starting in symbol j by a PDCCH ending in symbol i, the UE is not expected to be scheduled to receive a PDSCH starting earlier than the end of the first PDSCH with a PDCCH that ends later than symbol i. For any PDSCH corresponding to SI-RNTI, the UE is not expected to decode a re-transmission of an earlier PDSCH with a starting symbol less than N symbols after the last symbol of that PDSCH, where the value of N depends on the PDSCH subcarrier spacing configuration $\mu$ with N=13 for $\mu$=0, N=13 for $\mu$=1, N=20 for $\mu$=2, and N=24 for $\mu$=3.

When receiving PDSCH scheduled with SI-RNTI or P-RNTI, the UE 101 may assume that the DM-RS port of PDSCH is quasi co-located with the associated SS/PBCH block with respect to Doppler shift, Doppler spread, average delay, delay spread, spatial RX parameters when applicable.

When receiving PDSCH scheduled with RA-RNTI the UE 101 may assume that the DM-RS port of PDSCH is quasi co-located with the SS/PBCH block or the CSI-RS resource the UE 101 used for RACH association and transmission with respect to Doppler shift, Doppler spread, average delay, delay spread, spatial Rx parameters when applicable. When receiving a PDSCH scheduled with RA-RNTI in response to a random access procedure triggered by a PDCCH order which triggers non-contention based random access procedure for the SpCell discussed in 3GPP TS 38.321, the UE 101 may assume that the DM-RS port of the received PDCCH order and the DM-RS ports of the corresponding PDSCH scheduled with RA-RNTI are quasi co-located with the same SS/PBCH block or CSI-RS with respect to Doppler shift, Doppler spread, average delay, delay spread, spatial RX parameters when applicable.

When receiving PDSCH scheduled with TC-RNTI and/or when receiving PDSCH in response to a PUSCH transmission scheduled by a RAR UL grant or corresponding PUSCH retransmission the UE 101 may assume that the DM-RS port of PDSCH is quasi co-located with the SS/PBCH block the UE 101 selected for RACH association and transmission with respect to Doppler shift, Doppler spread, average delay, delay spread, spatial RX parameters when applicable.

If the UE 101 is not configured for PUSCH/PUCCH transmission for at least one serving cell configured with slot formats comprised of DL and UL symbols, and if the UE 101 is not capable of simultaneous reception and transmission on serving cell $c_1$ and serving cell $c_2$, the UE 101 is not expected to receive PDSCH on serving cell $c_1$ if the PDSCH overlaps in time with SRS transmission (including any interruption due to uplink or downlink RF retuning time as discussed in 3GPP TS 38.321) on serving cell $c_2$ not configured for PUSCH/PUCCH transmission.

The UE 101 is not expected to decode a PDSCH scheduled in the primary cell with C-RNTI or MCS-C-RNTI and another PDSCH scheduled in the primary cell with CS-RNTI if the PDSCHs partially or fully overlap in time.

The UE 101 is not expected to decode a PDSCH scheduled with C-RNTI, MCS-C-RNTI, or CS-RNTI if another PDSCH in the same cell scheduled with RA-RNTI partially or fully overlap in time.

The UE 101 in RRC_IDLE and RRC_INACTIVE modes shall be able to decode two PDSCHs each scheduled with SI-RNTI, P-RNTI, RA-RNTI or TC-RNTI, with the two PDSCHs partially or fully overlapping in time in non-overlapping PRBs.

On a frequency range 1 cell, the UE 101 is able to decode a PDSCH scheduled with C-RNTI, MCS-C-RNTI, or CS-RNTI and, during a process of P-RNTI triggered SI acquisition, another PDSCH scheduled with SI-RNTI that partially or fully overlap in time in non-overlapping PRBs, unless the PDSCH scheduled with C-RNTI, MCS-C-RNTI, or CS-RNTI requires Capability 2 processing time according to subclause 5.3 in which case the UE 101 may skip decoding of the scheduled PDSCH with C-RNTI, MCS-C-RNTI, or CS-RNTI.

On a frequency range 2 cell, the UE 101 is not expected to decode a PDSCH scheduled with C-RNTI, MCS-C-RNTI, or CS-RNTI if in the same cell, during a process of P-RNTI triggered SI acquisition, another PDSCH scheduled with SI-RNTI partially or fully overlap in time in non-overlapping PRBs.

The UE 101 is expected to decode a PDSCH scheduled with C-RNTI, MCS-C-RNTI, or CS-RNTI during a process of autonomous SI acquisition.

If the UE 101 is configured by higher layers to decode a PDCCH with its CRC scrambled by a CS-RNTI, the UE 101 receives PDSCH transmissions without corresponding PDCCH transmissions using the higher-layer-provided PDSCH configuration for those PDSCHs.

With respect to resource allocation for transmission of PDSCH, when the UE 101 is scheduled to receive PDSCH by a DCI, the Time domain resource assignment field value m of the DCI provides a row index m+1 to an allocation table. The determination of the used resource allocation table is defined in sub-clause 5.1.2.1.1 of 3GPP TS 38.214. The indexed row defines the slot offset $K_0$, the start and length indicator SLIV, or directly the start symbol S and the allocation length L, and the PDSCH mapping type to be assumed in the PDSCH reception. Given the parameter values of the indexed row:

The slot allocated for the PDSCH is $$\left\lfloor n \cdot \frac{2^{\mu_{PDSCH}}}{2^{\mu_{PDCCH}}} \right\rfloor + K_0,$$

where n is the slot with the scheduling DCI, and $K_0$ is based on the numerology of PDSCH, and $\mu_{PDSCH}$ and $\mu_{PDCCH}$ are the subcarrier spacing configurations for PDSCH and PDCCH, respectively, and The starting symbol S relative to the start of the slot, and the number of consecutive symbols L counting from the symbol S allocated for the PDSCH are determined from the start and length indicator SLIV: if $(L-1) \leq 7$ then SLIV=14·(L−1)+S, else SLIV=14·(14−L+1)+(14−1−S) where $0 < L \leq 14-S$, and the PDSCH mapping type is set to Type A or Type B as defined in sub-clause 7.4.1.1.2 of 3GPP TS 38.211.

The UE 101 is to consider the S and L combinations defined in table 1-1(a) as valid PDSCH allocations:

TABLE 1-1(a)

| PDSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A | {0, 1, 2, 3} (Note 1) | {3, ..., 14} | {3, ..., 14} | {0, 1, 2, 3} (Note 1) | {3, ..., 12} | {3, ..., 12} |
| Type B | {0, ..., 12} | {2, 4, 7} | {2, ..., 14} | {0, ..., 10} | {2, 4, 6} | {2, ..., 12} |

Note 1:
S = 3 is applicable only if dmrs-TypeA-Position = 3

When receiving PDSCH scheduled by PDCCH with CRC scrambled by C-RNTI, MCS-C-RNTI, CS-RNTI, or PDSCH scheduled without corresponding PDCCH transmission using sps-Config, if the UE 101 is configured with pdsch-AggregationFactor, the same symbol allocation is applied across the pdsch-AggregationFactor consecutive slots. The UE may expect that the TB is repeated within each symbol allocation among each of the pdsch-AggregationFactor consecutive slots and the PDSCH is limited to a single transmission layer. The redundancy version to be applied on the $n^{th}$ transmission occasion of the TB is determined according to table 1-1(b).

TABLE 1-1(b)

| Applied redundancy version when pdsch-AggregationFactor is present | | | | |
|---|---|---|---|---|
| $rv_{id}$ indicated by the DCI scheduling the PDSCH | $rv_{id}$ to be applied to $n^{th}$ transmission occasion | | | |
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

If the UE procedure for determining slot configuration as defined in subclause 11.1 of 3GPP TS 38.213 determines symbol of a slot allocated for PDSCH as uplink symbols, the transmission on that slot is omitted for multi-slot PDSCH transmission.

The UE 101 is not expected to receive a PDSCH with mapping type A in a slot, if the PDCCH scheduling the PDSCH was received in the same slot and was not contained within the first three symbols of the slot.

The UE 101 is not expected to receive a PDSCH with mapping type B in a slot, if the first symbol of the PDCCH scheduling the PDSCH was received in a later symbol than the first symbol indicated in the PDSCH time domain resource allocation.

With respect to determination of the resource allocation table to be used for PDSCH, table 1-2 defines which PDSCH time domain resource allocation configuration to apply. Either a default PDSCH time domain allocation A, B or C according to tables 1-3, 1-4, 1-5 and 1-6 is applied, or the higher layer configured pdsch-TimeDomainAllocationList in either pdsch-ConfigCommon or pdsch-Config is applied.

TABLE 1-2

| Applicable PDSCH time domain resource allocation | | | | | |
|---|---|---|---|---|---|
| RNTI | PDCCH search space | SS/PBCH block and CORESET multiplexing pattern | pdsch-ConfigCommon includes pdsch-TimeDomain-AllocationList | pdsch-Config includes pdsch-TimeDomain-AllocationList | PDSCH time domain resource allocation to apply |
| SI-RNTI | Type0 common | 1 | — | — | Default A for normal CP |
| | | 2 | — | — | Default B |
| | | 3 | — | — | Default C |
| SI-RNTI | Type0A common | 1 | No | — | Default A |
| | | 2 | No | — | Default B |
| | | 3 | No | — | Default C |
| | | 1, 2, 3 | Yes | — | pdsch-TimeDomain-AllocationList provided in pdsch-ConfigCommon |
| RA-RNTI, TC-RNTI | Type1 common | 1, 2, 3 | No | — | Default A |
| | | 1, 2, 3 | Yes | — | pdsch-TimeDomain-AllocationList provided in pdsch-ConfigCommon |
| P-RNTI | Type2 common | 1 | No | — | Default A |
| | | 2 | No | — | Default B |
| | | 3 | No | — | Default C |
| | | 1, 2, 3 | Yes | — | pdsch-TimeDomain-AllocationList provided in pdsch-ConfigCommon |

TABLE 1-2-continued

Applicable PDSCH time domain resource allocation

| RNTI | PDCCH search space | SS/PBCH block and CORESET multiplexing pattern | pdsch-ConfigCommon includes pdsch-TimeDomain-AllocationList | pdsch-Config includes pdsch-TimeDomain-AllocationList | PDSCH time domain resource allocation to apply |
|---|---|---|---|---|---|
| C-RNTI, MCS-C-RNTI, CS-RNTI | Any common search space associated with CORESET 0 | 1, 2, 3<br>1, 2, 3 | No<br>Yes | —<br>— | Default A<br>pdsch-TimeDomain-AllocationList provided in pdsch-ConfigCommon |
| C-RNTI, MCS-C-RNTI, CS-RNT1 | Any common search space not associated with CORESET 0 | 1, 2, 3<br>1, 2, 3 | No<br>Yes | No<br>No | Default A<br>pdsch-TimeDomain-AllocationList provided in pdsch-ConfigCommon |
|  | UE specific search space | 1, 2, 3 | No/Yes | Yes | pdsch-TimeDomain-AllocationList provided in pdsch-Config |

TABLE 1-3

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 5 |
|   | 3 | Type A | 0 | 3 | 6 |
| 5 | 2 | Type A | 0 | 7 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

TABLE 1-4

Default PDSCH time domain resource allocation A for extended CP

| Row index | dmrs-TypeA-Position | PDSCH mapping type | $K_0$ | S | L |
|---|---|---|---|---|---|
| 1 | 2 | Type A | 0 | 2 | 6 |
|   | 3 | Type A | 0 | 3 | 5 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 6 | 4 |
|   | 3 | Type B | 0 | 8 | 2 |
| 7 | 2 | Type B | 0 | 4 | 4 |
|   | 3 | Type B | 0 | 6 | 4 |
| 8 | 2, 3 | Type B | 0 | 5 | 6 |
| 9 | 2, 3 | Type B | 0 | 5 | 2 |
| 10 | 2, 3 | Type B | 0 | 9 | 2 |
| 11 | 2, 3 | Type B | 0 | 10 | 2 |
| 12 | 2, 3 | Type A | 0 | 1 | 11 |
| 13 | 2, 3 | Type A | 0 | 1 | 6 |
| 14 | 2, 3 | Type A | 0 | 2 | 4 |
| 15 | 2, 3 | Type B | 0 | 4 | 6 |
| 16 | 2, 3 | Type B | 0 | 8 | 4 |

TABLE 1-5

Default PDSCH time domain resource allocation B

| Row index | dmrs-TypeA-Position | PDSCH mapping type | $K_0$ | S | L |
|---|---|---|---|---|---|
| 1 | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | 2, 3 | Type B | 1 | 2 | 2 |
| 7 | 2, 3 | Type B | 1 | 4 | 2 |
| 8 | 2, 3 | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 (Note 1) | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
|   | 3 | Type A | 0 | 3 | 11 |
| 15 | 2, 3 | Type B | 1 | 2 | 4 |
| 16 | Reserved | | | | |

Note 1:
If the PDSCH was scheduled with SI-RNT1 in PDCCH Type0 common search space, the UE may assume that this PDSCH resource allocation is not applied

TABLE 1-6

Default PDSCH time domain resource allocation C

| Row index | dmrs-TypeA-Position | PDSCH mapping type | $K_0$ | S | L |
|---|---|---|---|---|---|
| 1 (Note 1) | 2, 3 | Type B | 0 | 2 | 2 |
| 2 | 2, 3 | Type B | 0 | 4 | 2 |
| 3 | 2, 3 | Type B | 0 | 6 | 2 |
| 4 | 2, 3 | Type B | 0 | 8 | 2 |
| 5 | 2, 3 | Type B | 0 | 10 | 2 |
| 6 | | Reserved | | | |
| 7 | | Reserved | | | |
| 8 | | Type B | 0 | 2 | 4 |
| 9 | 2, 3 | Type B | 0 | 4 | 4 |
| 10 | 2, 3 | Type B | 0 | 6 | 4 |
| 11 | 2, 3 | Type B | 0 | 8 | 4 |
| 12 | 2, 3 | Type B | 0 | 10 | 4 |
| 13 (Note 1) | 2, 3 | Type B | 0 | 2 | 7 |
| 14 (Note 1) | 2 | Type A | 0 | 2 | 12 |
| | 3 | Type A | 0 | 3 | 11 |
| 15 (Note 1) | 2, 3 | Type A | 0 | 0 | 6 |
| 16 (Note 1) | 2, 3 | Type A | 0 | 2 | 6 |

Note 1:
The UE may assume that this PDSCH resource allocation is not used, if the PDSCH was scheduled with SI-RNTI in PDCCH Type0 common search space With respect to resource allocation in time domain for transmitting PUSCH, when the UE 101 is scheduled to transmit a transport block and no CSI report, or the UE 101 is scheduled to transmit a transport block and a CSI report(s) on PUSCH by a DCI, the Time domain resource assignment field value m of the DCI provides a row index m+1 to an allocated table. The determination of the used resource allocation table is defined in sub-clause 6.1.2.1.1 of 3GPP TS 38.214. The indexed row defines the slot offset $K_2$, the start and length indicator SLIV, or directly the start symbol S and the allocation length L, and the PUSCH mapping type to be applied in the PUSCH transmission.

When the UE 101 is scheduled to transmit a PUSCH with no transport block and with a CSI report(s) by a CSI request field on a DCI, the Time-domain resource assignment field value m of the DCI provides a row index m+1 to an allocated table which is defined by the higher layer configured pusch-TimeDomainAllocationList in pusch-Config. The indexed row defines the start and length indicator SLIV, and the PUSCH mapping type to be applied in the PUSCH transmission and the $K_2$ value is determined as $$K_2 = \max_j Y_j(m+1),$$

where $Y_j$, $j=0, \ldots, N_{Rep}-1$ are the corresponding list entries of the higher layer parameter reportSlotOffsetList in CSI-ReportConfig for the $N_{Rep}$ triggered CSI Reporting Settings and $Y_j(m+1)$ is the (m+1)th entry of $Y_j$.

The slot where the UE 101 transmits the PUSCH is determined by $K_2$ as $$\left\lfloor n \cdot \frac{2^{\mu_{PUSCH}}}{2^{\mu_{PDCCH}}} \right\rfloor + K_2$$

where n is the slot with the scheduling DCI, $K_2$ is based on the numerology of PUSCH, an $\mu_{PUSCH}$ and $\mu_{PDCCH}$ are the subcarrier spacing configurations for PUSCH and PDCCH, respectively, and The starting symbol S relative to the start of the slot, and the number of consecutive symbols L counting from the symbol S allocated for the PUSCH are determined from the start and length indicator SLIV of the indexed row: if $(L-1) \leq 7$ then $SLIV=14 \cdot (L-1)+S$, else $SLIV=14 \cdot (14-L+1)+(14-1-S)$ where $0 < L \leq 14-S$, and The PUSCH mapping type is set to Type A or Type B as defined in Subclause 6.4.1.1.3 of 3GPP TS 38.211 as given by the indexed row.

The UE 101 considers the S and L combinations defined in table 1-7 as valid PUSCH allocations.

TABLE 1-7

Valid S and L combinations

| PUSCH mapping type | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 11} | {1, ..., 12} | {1, ..., 12} |

When transmitting PUSCH scheduled by PDCCH with CRC scrambled with C-RNTI, MCS-C-RNTI, if the UE 101 is configured with pusch-AggregationFactor, the same symbol allocation is applied across the pusch-AggregationFactor consecutive slots and the PUSCH is limited to a single transmission layer. The UE 101 repeats the TB across the pusch-AggregationFactor consecutive slots applying the same symbol allocation in each slot. The redundancy version to be applied on the nth transmission occasion of the TB is determined according to table 1-8.

TABLE 1-8

Redundancy version when pusch-AggregationFactor is present

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

If the UE 101 procedure for determining slot configuration, as defined in subclause 11.1 of 3GPP TS 38.213, determines symbols of a slot allocated for PUSCH as downlink symbols, the transmission on that slot is omitted for multi-slot PUSCH transmission.

With respect to determination of the resource allocation table to be used for PUSCH, Table 1-9 defines which PUSCH time domain resource allocation configuration to apply. Either a default PUSCH time domain allocation A according to table 1-10 of 3GPP TS 38.214, is applied, or the higher layer configured pusch-TimeDomainAllocationList in either pusch-ConfigCommon or pusch-Config is applied.

Table 1-12 defines the subcarrier spacing specific values j. j is used in determination of $K_2$ in conjunction to table 1-10, for normal CP or table 1-11 for extended CP, where $\mu_{PUSCH}$ is the subcarrier spacing configurations for PUSCH.

Table 1-13 defines the additional subcarrier spacing specific slot delay value for the first transmission of PUSCH scheduled by the RAR. When the UE 101 transmits a PUSCH scheduled by RAR, the Δ value specific to the PUSCH subcarrier spacing $\mu_{PUSCH}$ is applied in addition to the $K_2$ value.

TABLE 1-9

Applicable PUSCH time domain resource allocation

| RNTI | PDCCH search space | pusch-ConfigCommon includes pusch-TimeDomainAllocationList | pusch-Config includes pusch-TimeDomainAllocationList | PUSCH time domain resource allocation to apply |
|---|---|---|---|---|
| PUSCH scheduled by MAC RAR as described in subclause 8.2 of [6, TS 38.213] | | No Yes | — | Default A pusch-Time DomainAllocationList provided in pusch-ConfigCommon |
| C-RNTI, MCS-C-RNTI, TC-RNTI, CS-RNTI | Any common search space associated with CORESET 0 | No Yes | — | Default A pusch-AlloTimeDomaincationList provided in pusch-ConfigCommon |
| C-RNTI, MCS-C-RNTI, TC-RNTI, CS-RNTI | Any common search space not associated with COREST 0, UE specific search space | No Yes | No No | Default A pusch-TimeDomainAllocationList provided in pusch-ConfigCommon |
| CS-RNTI, SP-CSI-RNTI | | No/Yes | Yes | pusch-TimeDomainAllocationList provided in pusch-Config |

TABLE 1-10

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | i | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 1-11

Default PUSCH time domain resource allocation A for extended CP

| Row index | PUSCH mapping type | $K_2$ | S | L |
|---|---|---|---|---|
| 1 | Type A | j | 0 | 8 |
| 2 | Type A | j | 0 | 12 |
| 3 | Type A | j | 0 | 10 |
| 4 | Type B | j | 2 | 10 |
| 5 | Type B | j | 4 | 4 |
| 6 | Type B | i | 4 | 8 |
| 7 | Type B | j | 4 | 6 |
| 8 | Type A | j + 1 | 0 | 8 |
| 9 | Type A | j + 1 | 0 | 12 |
| 10 | Type A | j + 1 | 0 | 10 |
| 11 | Type A | j + 2 | 0 | 6 |
| 12 | Type A | j + 2 | 0 | 12 |
| 13 | Type A | j + 2 | 0 | 10 |
| 14 | Type B | j | 8 | 4 |
| 15 | Type A | j + 3 | 0 | 8 |
| 16 | Type A | j + 3 | 0 | 10 |

TABLE 1-12

Definition of value j

| $\mu_{PUSCH}$ | j |
|---|---|
| 0 | 1 |
| 1 | 1 |
| 2 | 2 |
| 3 | 3 |

TABLE 143

| $\mu_{PUSCH}$ | Δ |
|---|---|
| 0 | 2 |
| 1 | 3 |
| 2 | 4 |
| 3 | 6 |

The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some implementations may use concepts for resource allocation for control channel information that are an extension of the above-described concepts. For example, some implementations may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In implementations where the system 100 is an LTE system (e.g., when CN 120 is an EPC 220 as in FIG. 2), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C; may provide intra-LTE access mobility functionality, including context transfers from source to target eNBs, user plane transport control, etc.; load management functionality; as well as inter-cell interference coordination functionality.

In implementations where the system 100 is a 5G or NR system (e.g., when CN 120 is an 5GC 320 as in FIG. 3), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this implementation, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some implementations, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In implementations, the CN 120 may be a 5GC (referred to as "5GC 120" or the like), and the RAN 110 may be connected with the CN 120 via an NG interface 113. In implementations, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs. Implementations where the CN 120 is a 5GC 120 are discussed in more detail with regard to FIG. 3.

In implementations, the CN 120 may be a 5G CN (referred to as "5GC 120" or the like), while in other implementations, the CN 120 may be an EPC). Where CN 120 is an EPC (referred to as "EPC 120" or the like), the RAN 110 may be connected with the CN 120 via an S1 interface 113. In implementations, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
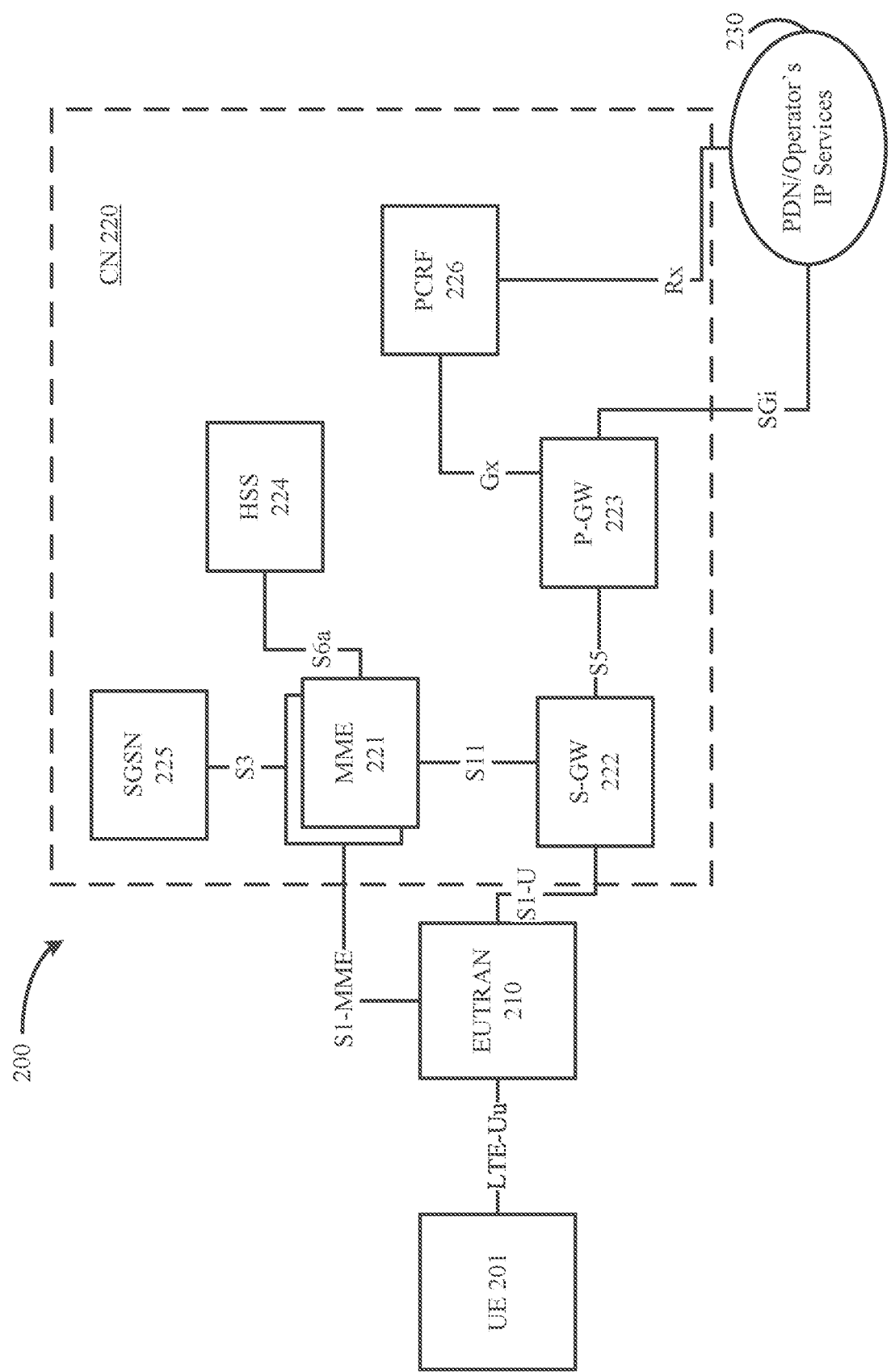
FIG. 2 illustrates an example architecture of a system including a first CN.

FIG. 2 illustrates an example architecture of a system 200 including a first CN, according to some implementations of the present disclosure. FIG. 2 illustrates an example architecture of a system 200 including a first CN 220, in accordance with various implementations. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the E-UTRAN 210 may be a RAN that is the same or similar to the RAN 110 of FIG. 1, and which may include RAN nodes 111 discussed previously. The CN 220 may comprise MMEs 221, an S-GW 222, a P-GW 223, a HSS 224, and a SGSN 225.

The MMEs 221 may be similar in function to the control plane of legacy SGSN, and may implement MM functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or perform other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMEs 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMEs 221; handling of UE 201 time zone functions as specified by the MMEs 221; and MME selection for handovers to E-UTRAN 3GPP access network. The S3 reference point between the MMEs 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HSS 224 and the MMEs 221 may enable transfer of subscription and authentication data for authenticating/authorizing user access to the EPC 220 between HISS 224 and the MMEs 221.

The S-GW 222 may terminate the S1 interface 113 ("S1-U" in FIG. 2) toward the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMEs 221 may provide a control plane between the MMEs 221 and the S-GW 222. The S-GW 222 may be coupled with the P-GW 223 via an S5 reference point.

The P-GW 223 may terminate an SGi interface toward a PDN 230. The P-GW 223 may route data packets between the EPC 220 and external networks such as a network including the application server 130 (alternatively referred to as an "AF") via an IP interface 125 (see e.g., FIG. 1). In implementations, the P-GW 223 may be communicatively coupled to an application server (application server 130 of FIG. 1 or PDN 230 in FIG. 2) via an IP communications interface 125 (see, e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., PCEF (not shown)). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

PCRF 226 is the policy and charging control element of the EPC 220. In a non-roaming scenario, there may be a single PCRF 226 in the Home Public Land Mobile Network (HPLMN) associated with a UE 201's Internet Protocol Connectivity Access Network (IP-CAN) session. In a roaming scenario with local breakout of traffic, there may be two PCRFs associated with a UE 201's IP-CAN session, a Home PCRF (H-PCRF) within an HPLMN and a Visited PCRF (V-PCRF) within a Visited Public Land Mobile Network (VPLMN). The PCRF 226 may be communicatively coupled to the application server 230 via the P-GW 223. The application server 230 may signal the PCRF 226 to indicate a new service flow and select the appropriate QoS and charging parameters. The PCRF 226 may provision this rule into a PCEF (not shown) with the appropriate TFT and QCI, which commences the QoS and charging as specified by the application server 230. The Gx reference point between the PCRF 226 and the P-GW 223 may allow for the transfer of QoS policy and charging rules from the PCRF 226 to PCEF in the P-GW 223. An Rx reference point may reside between the PDN 230 (or "AF 230") and the PCRF 226.

Figure 3:
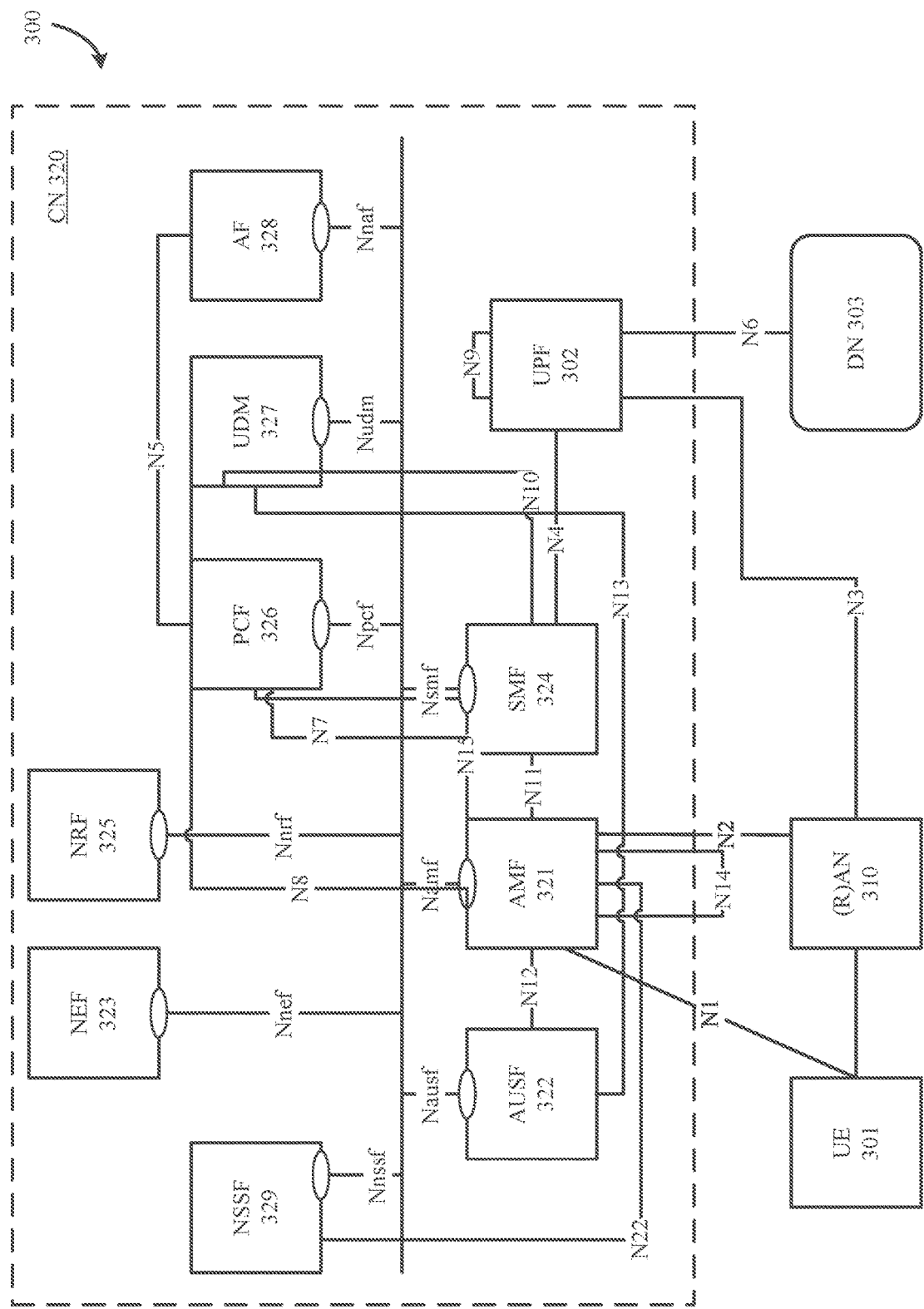
FIG. 3 illustrates an architecture of a system including a second CN.

FIG. 3 illustrates an architecture of a system 300 including a second CN, according to some implementations of the present disclosure. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a DN 303, which may be, for example, operator services, Internet access or 3rd party services; and a 5GC 320. The κGC 320 may include an AUSF 322; an AMF 321; a SMF 324; a NEF 323; a PCF 326, a NRF 325; a UDM 327; an AF 328; a UPF 302; and a NSSF 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform Uplink Traffic verification (e.g., SDF to QoS flow mapping), transport level packet marking in the uplink and downlink, and perform downlink packet buffering and downlink data notification triggering. UPF 302 may include an uplink classifier to support routing traffic flows to a data network. The DN 303 may represent various network operator services, Internet access, or third party services. DN 303 may include, or be similar to, application server 130 discussed previously. The UPF 302 may interact with the SMF 324 via an N4 reference point between the SMF 324 and the UPF 302.

The AUSF 322 may store data for authentication of UE 301 and handle authentication-related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the N11 reference point between the AMF 321 and the SMF 324. The AMF 321 may provide transport for SM messages between the UE 301 and the SMF 324, and act as a transparent proxy for routing SM messages. AMF 321 may also provide transport for SMS messages between UE 301 and an SMSF (not shown by FIG. 3). AMF 321 may act as SEAF, which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a SCM function, which receives a key from the SEA that it uses to derive access-network specific keys. Furthermore. AMF 321 may be a termination point of a RAN CP interface, which may include or be an N2 reference point between the (R)AN 310 and the AMF 321; and the AMF 321 may be a termination point of NAS (N1) signalling, and perform NAS ciphering and integrity protection.

AMF 321 may also support NAS signalling with a UE 301 over an N3 IWF interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunneling, mark N3 user-plane packets in the uplink, and enforce QoS corresponding to N3 packet marking taking into account QoS requirements associated with such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-EIR (not shown by FIG. 3).

The UE 301 may need to register with the AMF 321 in order to receive network services RM is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedures triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various implementations, the AMF 321 may store a CE mode B Restriction parameter of the UE 301 in an associated MM context or RM context. The AMF 321 may also derive the value, when needed, from the UE's usage setting parameter already stored in the UE context (and/or MM/RM context).

CM may be used to establish and release a signaling connection between the UE 301 and the AMF 321 over the N1 interface. The signaling connection is used to enable NAS signaling exchange between the UE 301 and the CN 320, and comprises both the signaling connection between the UE and the AN (e.g., RRC connection or UE-N3IWF connection for non-3GPP access) and the N2 connection for the UE 301 between the AN (e.g., RAN 310) and the AMF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for SM (e.g., session establishment, modify and release, including tunnel maintain between UPF and AN node); UE IP address allocation and management (including optional authorization); selection and control of UP function; configuring traffic steering at UPF to route traffic to proper destination; termination of interfaces toward policy control functions; controlling part of policy enforcement and QoS; lawful intercept (for SM events and interface to LI system); termination of SM parts of NAS messages; downlink data notification; initiating AN specific SM information, sent via AMF over N2 to AN; and determining SSC mode of a session. SM may refer to management of a PDU session, and a PDU session or "session" may refer to a PDU connectivity service that provides or enables the exchange of PDUs between a UE 301 and a data network (DN) 303 identified by a Data Network Name (DNN). PDU sessions may be established upon UE 301 request, modified upon UE 301 and 5GC 320 request, and released upon UE 301 and 5GC 320 request using NAS SM signaling exchanged over the N1 reference point between the UE 301 and the SMF 324. Upon request from an application server, the 5GC 320 may trigger a specific application in the UE 301. In response to receipt of the trigger message, the UE 301 may pass the trigger message (or relevant parts/information of the trigger message) to one or more identified applications in the UE 301. The identified application(s) in the UE 301 may establish a PDU session to a specific DNN. The SMF 324 may check whether the UE 301 requests are compliant with user subscription information associated with the UE 301. In this regard, the SMF 324 may retrieve and/or request to receive update notifications on SMF 324 level subscription data from the UDM 327.

The SMF 324 may include the following roaming functionality: handling local enforcement to apply QoS SLAs (VPLMN); charging data collection and charging interface (VPLMN); lawful intercept (in VPLMN for SM events and interface to LI system); and support for interaction with external DN for transport of signalling for PDU session authorization/authentication by external DN. An N 16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such implementations, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF discovery requests from NF instances, and provide the information of the discovered NF instances to the NF instances. NRF 325 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement an FE to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 300 and/or CN 320 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF. The UDM 327 may include two parts, an application FE and a UDR (the FE and UDR are not shown by FIG. 3). The UDR may store subscription data and policy data for the UDM 327 and the PCF 326, and/or structured data for exposure and application data (including PFDs for application detection, application request information for multiple UEs 301) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, provide access to the NCE, and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs Additionally, the AF 328 may exhibit an Naf service-based interface.

The NSSF 329 may select a set of network slice instances serving the UE 301. The NSSF 329 may also determine allowed NSSAI and the mapping to the subscribed S-NSSAIs, if needed. The NSSF 329 may also determine the AMF set to be used to serve the UE 301, or a list of candidate AMF(s) 321 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for a notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-EIR, a SEPP, and the like. The Data Storage system may include a SDSF, an UDSF, and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of PEI for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity In one example, the CN 320 may include an Nx interface, which is an inter-CN interface between the MME (e.g., MME 221) and the AMF 321 in order to enable interworking between CN 320 and CN 220. Other example interfaces/reference points may include an N5g-EIR service-based interface exhibited by a 5G-EIR, an N27 reference point between the NRF in the visited network and the NRF in the home network; and an N31 reference point between the NSSF in the visited network and the NSSF in the home network.

Figure 4:
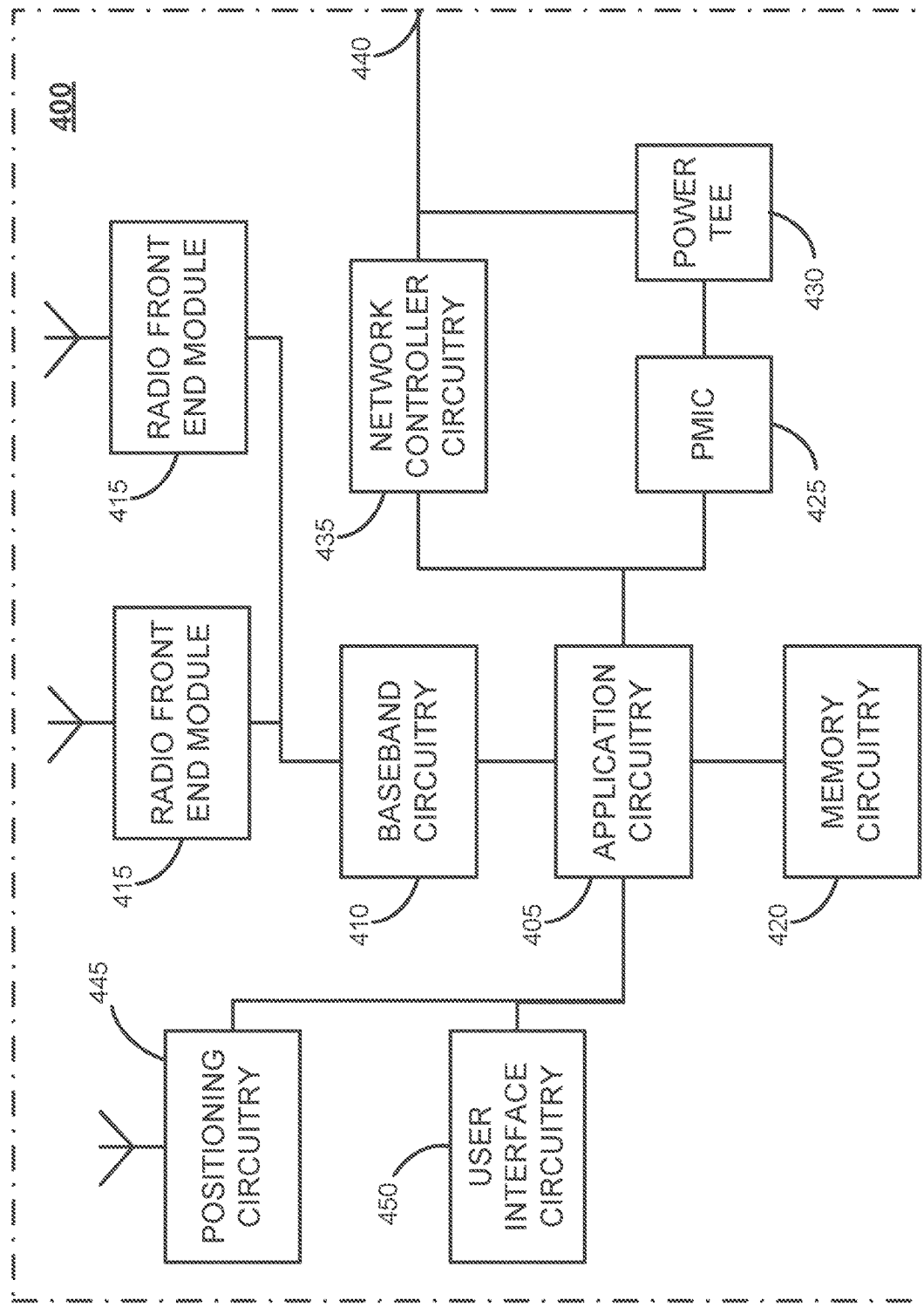
FIG. 4 illustrates an example of infrastructure equipment.

FIG. 4 illustrates an example of infrastructure equipment 400, according to some implementations of the present disclosure. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE.

The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface circuitry 450. In some implementations, the device 400 may include additional elements such as, for example, memory/storage, display, camera, sensor, or input/output (I/O) interface. In other implementations, the components described below may be included in more than one device. For example, said circuitries may be separately included in more than one device for CRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some implementations, the application circuitry 405 may comprise, or may be, a special-purpose processor/controller to operate according to the various implementations herein. As examples, the processor(s) of application circuitry 405 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2@ provided by Cavium™, Inc.; a MIPS-based design from MIPS Technologies, Inc. such as MIPS Warrior P-class processors; and/or the like. In some implementations, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various implementations discussed herein In such implementations, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 6.

User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 415, which incorporates both mmWave antennas and sub-mmWave.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an $I^2C$ interface, an SPI interface, point to point interfaces, and a power bus, among others.

Figure 5:
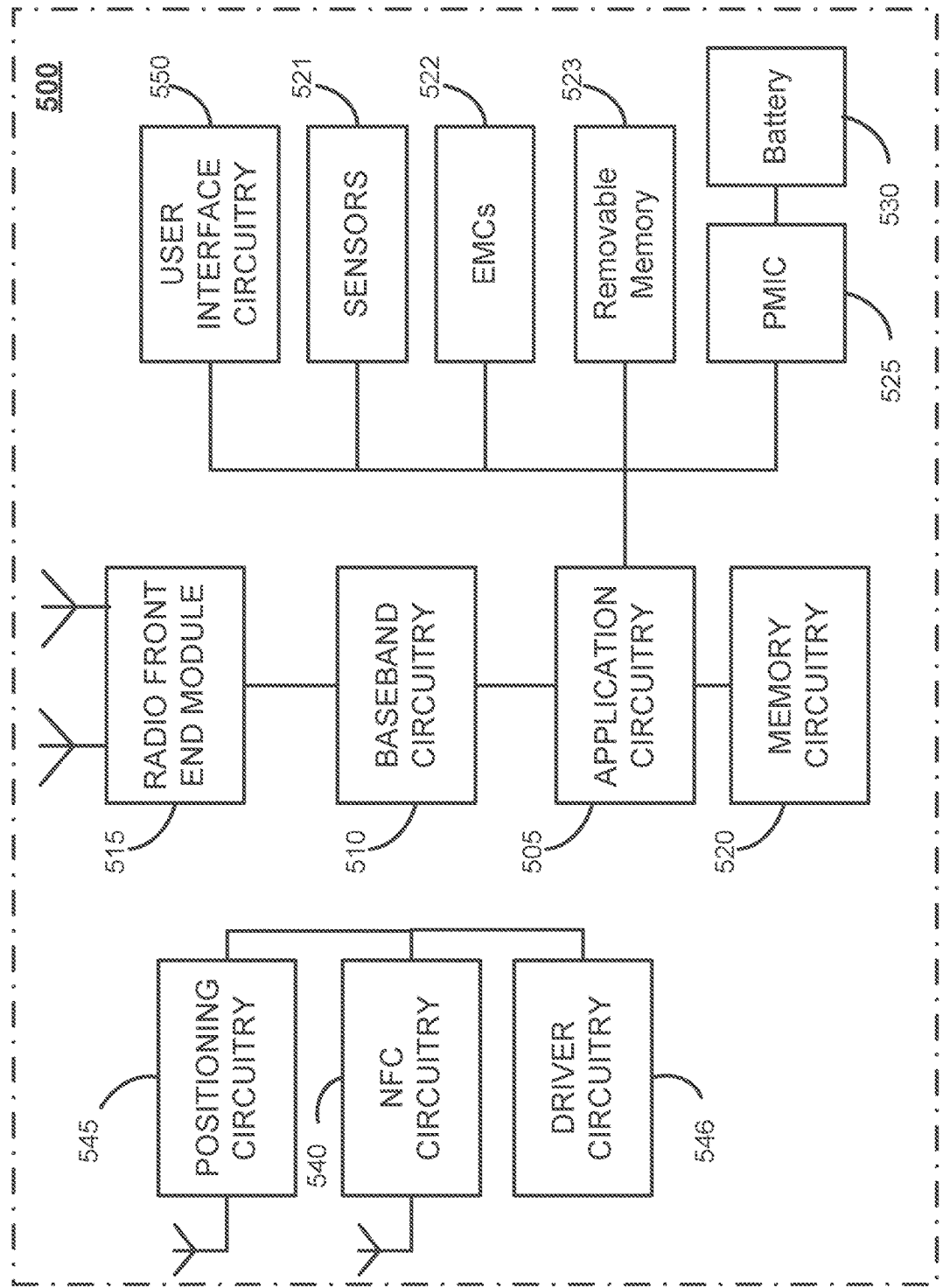
FIG. 5 illustrates an example of a platform.

FIG. 5 illustrates an example of a platform 500, according to some implementations of the present disclosure. In implementations, the computer platform 500 may be suitable for use as UEs 101, 201, 301, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, $I^2C$ or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some implementations, the application circuitry 405 may comprise, or may be, a special-purpose processor/controller to operate according to the various implementations herein.

As examples, the processor(s) of application circuitry 505 may include an Apple A-series processor. The processors of the application circuitry 505 may also be one or more of an Intel® Architecture Core™ based processor, such as a Quark™, an Atom™, an i3, an i5, an i7, or an MCU-class processor, or another such processor available from Intel® Corporation, Santa Clara, CA; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 505 may comprise logic blocks or logic fabric, and other interconnected resources that may be programmed to perform various functions, such as the procedures, methods, functions, etc. of the various implementations discussed herein. In such implementations, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 510 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 510 are discussed infra with regard to FIG. 6.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 611 of FIG. 6 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including random access memory (RAM), dynamic RAM (DRAM)

and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry include sensor circuitry 521 and electro-mechanical components (EMCs) 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 522 include devices, modules, or subsystems whose purpose is to enable platform 500 to change its state, position, and/or orientation, or move or control a mechanism or (sub)system. Additionally, EMCs 522 may be configured to generate and send messages/signalling to other components of the platform 500 to indicate a current state of the EMCs 522. Examples of the EMCs 522 include one or more power switches, relays including electromechanical relays (FMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In implementations, platform 500 is configured to operate one or more EMCs 522 based on one or more captured events and/or instructions or control signals received from a service provider and/or various clients.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some implementations, the positioning circuitry 545 may include a Micro-PNT IC that uses a master timing clock to perform position tracking/estimation without GNSS assistance. The positioning circuitry 545 may also be part of, or interact with, the baseband circuitry 410 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like.

In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 201, 301.

In some implementations, the PMIC 525 may control, or otherwise be part of, various power saving mechanisms of the platform 500. For example, if the platform 500 is in an RRC_Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state, in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various input/output (I/O) devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some implementations, the sensor circuitry 521 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 500 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 6:
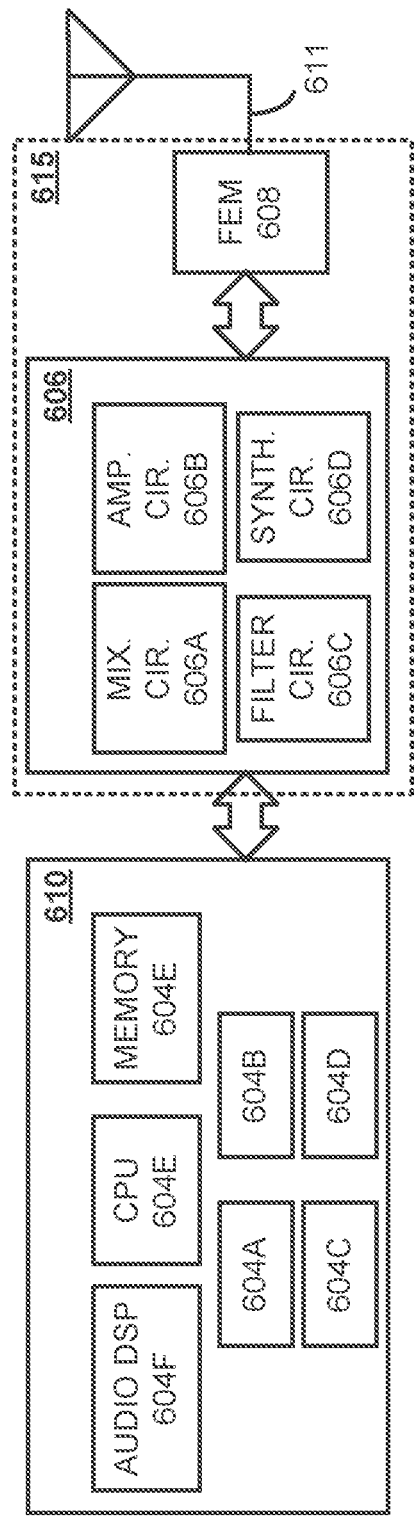
FIG. 6 illustrates example components of baseband circuitry and radio front end modules (RFEM).

FIG. 6 illustrates example components of baseband circuitry 610 and radio front end modules (RFEM) 615, according to some implementations of the present disclosure. The baseband circuitry 610 corresponds to the baseband circuitry 410 and 510 of FIGS. 4 and 5, respectively. The RFEM 615 corresponds to the RFEM 415 and 515 of FIGS. 4 and 5, respectively. As shown, the RFEMs 615 may include Radio Frequency (RF) circuitry 606, front-end module (FEM) circuitry 608, antenna array 611 coupled together at least as shown.

The baseband circuitry 610 includes circuitry and/or control logic configured to carry out various radio/network protocol and radio control functions that enable communication with one or more radio networks via the RF circuitry 606. The radio control functions may include, but are not limited to, signal modulation/demodulation, encoding/decoding, radio frequency shifting, etc. In some implementations, modulation/demodulation circuitry of the baseband circuitry 610 may include Fast-Fourier Transform (FFT), precoding, or constellation mapping/demapping functionality. In some implementations, encoding/decoding circuitry of the baseband circuitry 610 may include convolution, tail-biting convolution, turbo, Viterbi, or Low Density Parity Check (LDPC) encoder/decoder functionality. Implementations of modulation/demodulation and encoder/decoder functionality are not limited to these examples and may include other suitable functionality in other implementations. The baseband circuitry 610 is configured to process baseband signals received from a receive signal path of the RF circuitry 606 and to generate baseband signals for a transmit signal path of the RF circuitry 606. The baseband circuitry 610 is configured to interface with application circuitry 405/505 (see FIGS. 4 and 5) for generation and processing of the baseband signals and for controlling operations of the RF circuitry 606. The baseband circuitry 610 may handle various radio control functions.

The aforementioned circuitry and/or control logic of the baseband circuitry 610 may include one or more single or multi-core processors. For example, the one or more processors may include a 3G baseband processor 604A, a 4G/LTE baseband processor 604B, a 5G/NR baseband processor 604C, or some other baseband processor(s) 604D for other existing generations, generations in development or to be developed in the future (e.g., sixth generation (6G), etc.). In other implementations, some or all of the functionality of baseband processors 604A-D may be included in modules stored in the memory 604G and executed via a Central Processing Unit (CPU) 604E. In other implementations, some or all of the functionality of baseband processors 604A-D may be provided as hardware accelerators (e.g., FPGAs, ASICs, etc.) loaded with the appropriate bit streams or logic blocks stored in respective memory cells. In various implementations, the memory 604G may store program code of a real-time OS (RTOS), which when executed by the CPU 604E (or other baseband processor), is to cause the CPU 604E (or other baseband processor) to manage resources of the baseband circuitry 610, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 610 includes one or more audio digital signal processor(s) (DSP) 604F. The audio DSP(s) 604F include elements for compression/decompression and echo cancellation and may include other suitable processing elements in other implementations.

In some implementations, each of the processors 604A-XT104E include respective memory interfaces to send/receive data to/from the memory 604G. The baseband circuitry 610 may further include one or more interfaces to communicatively couple to other circuitries/devices, such as an interface to send/receive data to/from memory external to the baseband circuitry 610; an application circuitry interface to send/receive data to/from the application circuitry 405/505 of FIG. 4-XT); an RF circuitry interface to send/receive data to/from RF circuitry 606 of FIG. 6; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 525.

In alternate implementations (which may be combined with the above described implementations), baseband circuitry 610 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 610 may include protocol processing circuitry with one or more instances of control circuitry (not shown) to provide control functions for the digital baseband circuitry and/or radio frequency circuitry (e.g., the radio front end modules 615).

Although not shown by FIG. 6, in some implementations, the baseband circuitry 610 includes individual processing device(s) to operate one or more wireless communication protocols (e.g., a "multi-protocol baseband processor" or "protocol processing circuitry") and individual processing device(s) to implement PHY layer functions. In these implementations, the PHY layer functions include the aforementioned radio control functions. In these implementations, the protocol processing circuitry operates or implements various protocol layers/entities of one or more wireless communication protocols. In a first example, the protocol processing circuitry may operate LTE protocol entities and/or 5G/NR protocol entities when the baseband circuitry 610 and/or RF circuitry 606 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 610 and/or RF circuitry 606 are part of a Wi-Fi communication system. In the second example, the protocol processing circuitry would operate Wi-Fi MAC and logical link control (LLC) functions. The protocol processing circuitry may include one or more memory structures (e.g., 604G) to store program code and data for operating the protocol functions, as well as one or more processing cores to execute the program code and perform various operations using the data. The baseband circuitry 610 may also support radio communications for more than one wireless protocol.

The various hardware elements of the baseband circuitry 610 discussed herein may be implemented, for example, as a solder-down substrate including one or more integrated circuits (ICs), a single packaged IC soldered to a main circuit board or a multi-chip module containing two or more ICs. In one example, the components of the baseband circuitry 610 may be suitably combined in a single chip or chipset, or disposed on a same circuit board. In another example, some or all of the constituent components of the baseband circuitry 610 and RF circuitry 606 may be implemented together such as, for example, a system on a chip (SoC) or System-in-Package (SiP). In another example, some or all of the constituent components of the baseband circuitry 610 may be implemented as a separate SoC that is communicatively coupled with and RF circuitry 606 (or multiple instances of RF circuitry 606). In yet another example, some or all of the constituent components of the baseband circuitry 610 and the application circuitry 405/505 may be implemented together as individual SoCs mounted to a same circuit board (e.g., a "multi-chip package").

In some implementations, the baseband circuitry 610 may provide for communication compatible with one or more radio technologies. For example, in some implementations, the baseband circuitry 610 may support communication with an E-UTRAN or other WMAN, a WLAN, a WPAN. Implementations in which the baseband circuitry 610 is configured to support radio communications of more than one wireless protocol may be referred to as multi-mode baseband circuitry.

RF circuitry 606 may enable communication with wireless networks using modulated electromagnetic radiation through a non-solid medium. In various implementations, the RF circuitry 606 may include switches, filters, amplifiers, etc. to facilitate the communication with the wireless network. RF circuitry 606 may include a receive signal path, which may include circuitry to down-convert RF signals received from the FEM circuitry 608 and provide baseband signals to the baseband circuitry 610. RF circuitry 606 may also include a transmit signal path, which may include circuitry to up-convert baseband signals provided by the baseband circuitry 610 and provide RF output signals to the FEM circuitry 608 for transmission.

In some implementations, the receive signal path of the RF circuitry 606 may include mixer circuitry 606a, amplifier circuitry 606b and filter circuitry 606c. In some implementations, the transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some implementations, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 610 for further processing. In some implementations, the output baseband signals may be zero-frequency baseband signals, although this is not a requirement. In some implementations, mixer circuitry 606a of the receive signal path may comprise passive mixers, although the scope of the implementations is not limited in this respect.

In some implementations, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 610 and may be filtered by filter circuitry 606c.

In some implementations, the mixer circuitry 606a of the receive signal path and the mixer circuitry 606a of the transmit signal path may include two or more mixers and may be arranged for quadrature downconversion and upconversion, respectively. In some implementations, the mixer circuitry 606a of the receive signal path and the mixer circuitry 606a of the transmit signal path may include two or more mixers and may be arranged for image rejection (e.g., Hartley image rejection). In some implementations, the mixer circuitry 606a of the receive signal path and the mixer circuitry 606a of the transmit signal path may be arranged for direct downconversion and direct upconversion, respectively. In some implementations, the mixer circuitry 606a of the receive signal path and the mixer circuitry 606a of the transmit signal path may be configured for super-heterodyne operation.

In some implementations, the output baseband signals and the input baseband signals may be analog baseband signals, although the scope of the implementations is not limited in this respect. In some alternate implementations, the output baseband signals and the input baseband signals may be digital baseband signals. In these alternate implementations, the RF circuitry 606 may include analog-to-digital converter (ADC) and digital-to-analog converter (DAC) circuitry and the baseband circuitry 610 may include a digital baseband interface to communicate with the RF circuitry 606.

In some dual-mode implementations, a separate radio IC circuitry may be provided for processing signals for each spectrum, although the scope of the implementations is not limited in this respect.

In some implementations, the synthesizer circuitry 606d may be a fractional-N synthesizer or a fractional N/N+1 synthesizer, although the scope of the implementations is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

Synthesizer circuitry 606d may be configured to synthesize an output frequency for use by the mixer circuitry 606a of the RF circuitry 606 based on a frequency input and a divider control input. In some implementations, the synthesizer circuitry 606d may be a fractional N/N+1 synthesizer.

In some implementations, frequency input may be provided by a voltage controlled oscillator (VCO), although that is not a requirement. Divider control input may be provided by either the baseband circuitry 610 or the application circuitry 405/505 depending on the desired output frequency. In some implementations, a divider control input (e.g., N) may be determined from a look-up table based on a channel indicated by the application circuitry 405/XS205.

Synthesizer circuitry 606d of the RF circuitry 606 may include a divider, a delay-locked loop (DLL), a multiplexer and a phase accumulator. In some implementations, the divider may be a dual modulus divider (DMD) and the phase accumulator may be a digital phase accumulator (DPA). In some implementations, the DMD may be configured to divide the input signal by either N or N+1 (e.g., based on a carry out) to provide a fractional division ratio. In some example implementations, the DLL may include a set of cascaded, tunable, delay elements, a phase detector, a charge pump and a D-type flip-flop. In these implementations, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some implementations, synthesizer circuitry 606d may be configured to generate a carrier frequency as the output frequency, while in other implementations, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some implementations, the output frequency may be a LO frequency (fLO). In some implementations, the RF circuitry 606 may include an IQ/polar converter.

FEM circuitry 608 may include a receive signal path, which may include circuitry configured to operate on RF signals received from antenna array 611, amplify the received signals and provide the amplified versions of the received signals to the RF circuitry 606 for further processing. FEM circuitry 608 may also include a transmit signal path, which may include circuitry configured to amplify signals for transmission provided by the RF circuitry 606 for transmission by one or more of antenna elements of antenna array 611. In various implementations, the amplification through the transmit or receive signal paths may be done solely in the RF circuitry 606, solely in the FEM circuitry 608, or in both the RF circuitry 606 and the FEM circuitry 608.

In some implementations, the FEM circuitry 608 may include a TX/RX switch to switch between transmit mode and receive mode operation. The FEM circuitry 608 may include a receive signal path and a transmit signal path. The receive signal path of the FEM circuitry 608 may include an LNA to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission by one or more antenna elements of the antenna array 611.

The antenna array 611 comprises one or more antenna elements, each of which is configured convert electrical signals into radio waves to travel through the air and to convert received radio waves into electrical signals. For example, digital baseband signals provided by the baseband circuitry 610 is converted into analog RF signals (e.g., modulated waveform) that will be amplified and transmitted via the antenna elements of the antenna array 611 including one or more antenna elements (not shown). The antenna elements may be omnidirectional, direction, or a combination thereof. The antenna elements may be formed in a multitude of arranges as are known and/or discussed herein. The antenna array 611 may comprise microstrip antennas or printed antennas that are fabricated on the surface of one or more printed circuit boards. The antenna array 611 may be formed in as a patch of metal foil (e.g., a patch antenna) in a variety of shapes, and may be coupled with the RF circuitry 606 and/or FEM circuitry 608 using metal transmission lines or the like.

Processors of the application circuitry 405/XS205 and processors of the baseband circuitry 610 may be used to execute elements of one or more instances of a protocol stack. For example, processors of the baseband circuitry 610, alone or in combination, may be used execute Layer 3, Layer 2, or Layer 1 functionality, while processors of the application circuitry 405/XS205 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 7:
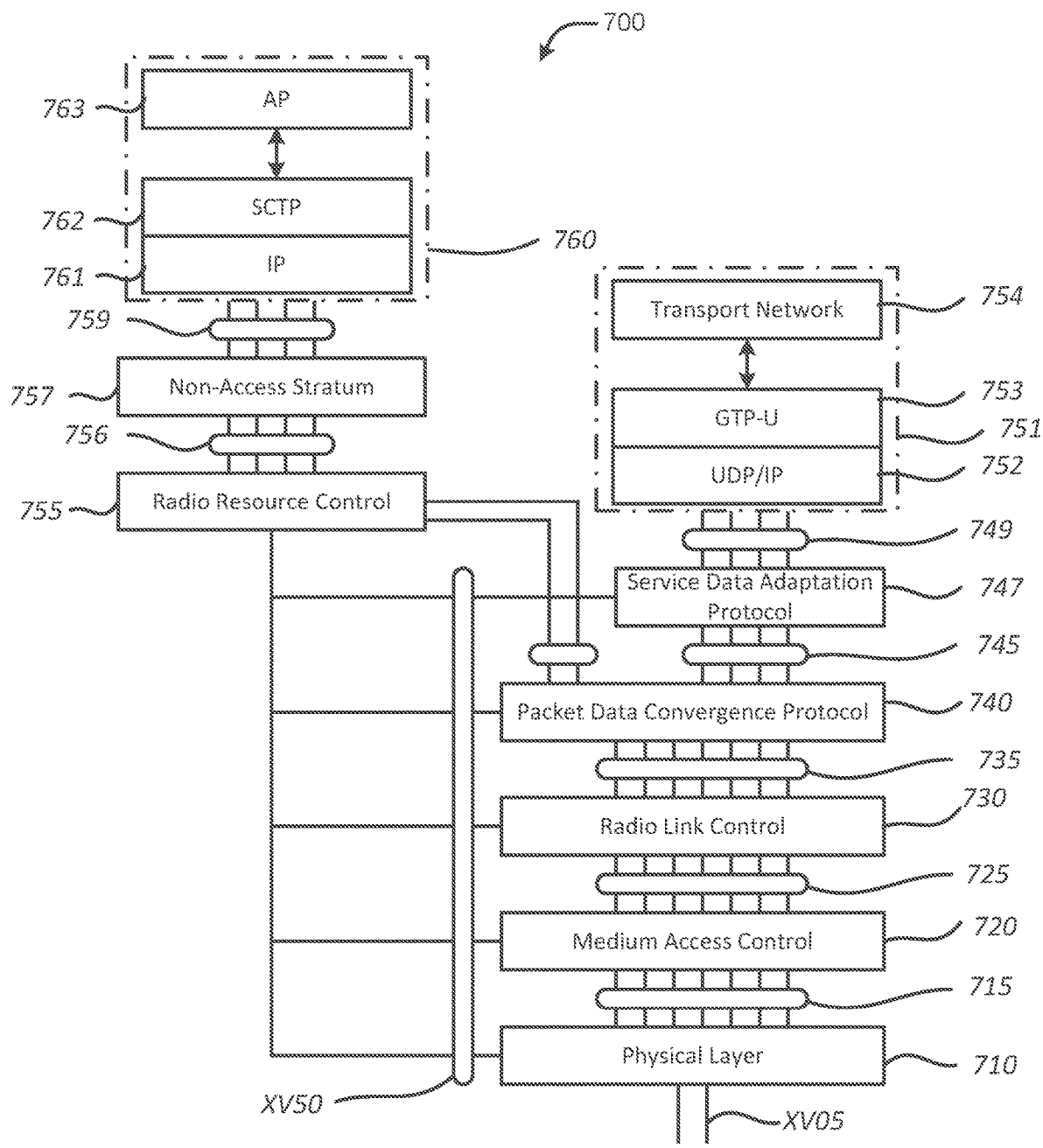
FIG. 7 illustrates various protocol functions that may be implemented in a wireless communication device.

FIG. 7 illustrates various protocol functions that may be implemented in a wireless communication device, according to some implementations of the present disclosure. In particular, FIG. 7 includes an arrangement 700 showing interconnections between various protocol layers/entities. The following description of FIG. 7 is provided for various protocol layers/entities that operate in conjunction with the 5G/NR system standards and LTE system standards, but some or all of the aspects of FIG. 7 may be applicable to other wireless communication network systems as well.

The protocol layers of arrangement 700 may include one or more of PHY 710, MAC 720, RLC 730, PDCP 740, SDAP 747, RRC 755, and NAS layer 757, in addition to other higher layer functions not illustrated. The protocol layers may include one or more service access points (e.g., items 759, 756, 750, 749, 745, 735, 725, and 715 in FIG. 7) that may provide communication between two or more protocol layers.

The PHY 710 may transmit and receive physical layer signals 705 that may be received from or transmitted to one or more other communication devices. The physical layer signals 705 may comprise one or more physical channels, such as those discussed herein. The PHY 710 may further perform link adaptation or adaptive modulation and coding (AMC), power control, cell search (e.g., for initial synchronization and handover purposes), and other measurements used by higher layers, such as the RRC 755. The PHY 710 may still further perform error detection on the transport channels, forward error correction (FEC) coding/decoding of the transport channels, modulation/demodulation of physical channels, interleaving, rate matching, mapping onto physical channels, and MIMO antenna processing. In implementations, an instance of PHY 710 may process requests from and provide indications to an instance of MAC 720 via one or more PHY-SAP 715. According to some implementations, requests and indications communicated via PHY-SAP 715 may comprise one or more transport channels.

Instance(s) of MAC 720 may process requests from, and provide indications to, an instance of RLC 730 via one or more MAC-SAPs 725. These requests and indications communicated via the MAC-SAP 725 may comprise one or more logical channels. The MAC 720 may perform mapping between the logical channels and transport channels, multiplexing of MAC SDUs from one or more logical channels onto TBs to be delivered to PHY 710 via the transport channels, de-multiplexing MAC SDUs to one or more logical channels from TBs delivered from the PHY 710 via transport channels, multiplexing MAC SDUs onto TBs, scheduling information reporting, error correction through HARQ, and logical channel prioritization.

Instance(s) of RLC 730 may process requests from and provide indications to an instance of PDCP 740 via one or more radio link control service access points (RLC-SAP)

735. These requests and indications communicated via RLC-SAP 735 may comprise one or more RLC channels. The RLC 730 may operate in a plurality of modes of operation, including: Transparent Mode (TM), Unacknowledged Mode (UM), and Acknowledged Mode (AM). The RLC 730 may execute transfer of upper layer protocol data units (PDUs), error correction through automatic repeat request (ARQ) for AM data transfers, and concatenation, segmentation and reassembly of RLC SDUs for UM and AM data transfers. The RLC 730 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 740 may process requests from and provide indications to instance(s) of RRC 755 and/or instance(s) of SDAP 747 via one or more packet data convergence protocol service access points (PDCP-SAP) 745. These requests and indications communicated via PDCP-SAP 745 may comprise one or more radio bearers. The PDCP 740 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 747 may process requests from and provide indications to one or more higher layer protocol entities via one or more SDAP-SAP 749. These requests and indications communicated via SDAP-SAP 749 may comprise one or more QoS flows. The SDAP 747 may map QoS flows to DRBs, and vice versa, and may also mark QFIs in DL and UL packets. A single SDAP entity 747 may be configured for an individual PDU session. In the UL direction, the NG-RAN 110 may control the mapping of QoS Flows to DRB(s) in two different ways, reflective mapping or explicit mapping. For reflective mapping, the SDAP 747 of a UE 101 may monitor the QFIs of the DL packets for each DRB, and may apply the same mapping for packets flowing in the UL direction. For a DRB, the SDAP 747 of the UE 101 may map the UL packets belonging to the QoS flows(s) corresponding to the QoS flow ID(s) and PDU session observed in the DL packets for that DRB. To enable reflective mapping, the NG-RAN 310 may mark DL packets over the Uu interface with a QoS flow ID. The explicit mapping may involve the RRC 755 configuring the SDAP 747 with an explicit QoS flow to DRB mapping rule, which may be stored and followed by the SDAP 747. In implementations, the SDAP 747 may only be used in NR implementations and may not be used in LTE implementations.

The RRC 755 may configure, via one or more management service access points (M-SAP), aspects of one or more protocol layers, which may include one or more instances of PHY 710, MAC 720, RLC 730, PDCP 740 and SDAP 747. In implementations, an instance of RRC 755 may process requests from and provide indications to one or more NAS entities 757 via one or more RRC-SAPs 756. The main services and functions of the RRC 755 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 757 may form the highest stratum of the control plane between the UE 101 and the AMF 321. The NAS 757 may support the mobility of the UEs 101 and the session management procedures to establish and maintain IP connectivity between the UE 101 and a P-GW in LTE systems.

According to various implementations, one or more protocol entities of arrangement 700 may be implemented in UEs 101, RAN nodes 111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such implementations, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some implementations, a gNB-CU of the gNB 111 may host the RRC 755, SDAP 747, and PDCP 740 of the gNB that controls the operation of one or more gNB-DUs, and the gNB-DUs of the gNB 111 may each host the RLC 730, MAC 720, and PHY 710 of the gNB 111.

In a first example, a control plane protocol stack may comprise, in order from highest layer to lowest layer, NAS 757, RRC 755, PDCP 740, RLC 730, MAC 720, and PHY 710. In this example, upper layers 760 may be built on top of the NAS 757, which includes an IP layer 761, an SCTP 762, and an application layer signaling protocol (AP) 763.

In NR implementations, the AP 763 may be an NG application protocol layer (NGAP or NG-AP) 763 for the NG interface 113 defined between the NG-RAN node 111 and the AMF 321, or the AP 763 may be an Xn application protocol layer (XnAP or Xn-AP) 763 for the Xn interface 112 that is defined between two or more RAN nodes 111.

The NG-AP 763 may support the functions of the NG interface 113 and may comprise Elementary Procedures (EPs). An NG-AP EP may be a unit of interaction between the NG-RAN node 111 and the AMF 321. The NG-AP 763 services may comprise two groups: UE-associated services (e.g., services related to a UE 101) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; a UE context management function for allowing the AMF 321 to establish, modify, and/or release a UE context in the AMF 321 and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 763 may support the functions of the Xn interface 112 and may comprise XnAP basic mobility procedures and XnAP global procedures. The XnAP basic mobility procedures may comprise procedures used to handle UE mobility within the NG RAN 111 (or F-UTRAN 210), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 763 may be an SI Application Protocol layer (SI-AP) 763 for the S1 interface 113 defined between an E-UTRAN node 111 and an MME, or the AP 763 may be an X2 application protocol layer (X2AP or X2-AP) 763 for the X2 interface 112 that is defined between two or more E-UTRAN nodes 111.

The SI Application Protocol layer (S1-AP) 763 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 763 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 763 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 762 may provide guaranteed delivery of application layer messages (e.g., NGAP or XnAP messages in NR implementations, or S1-AP or X2AP messages in LTE implementations). The SCTP 762 may ensure reliable delivery of signaling messages between the RAN node 111 and the AMF 321/MME 221 based, in part, on the IP protocol, supported by the IP 761. The Internet Protocol layer (IP) 761 may be used to perform packet addressing and routing functionality. In some implementations the IP layer 761 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 747, PDCP 740, RLC 730, MAC 720, and PHY 710. The user plane protocol stack may be used for communication between the UE 101, the RAN node 111, and UPF 302 in NR implementations or an S-GW 222 and P-GW 223 in LTE implementations In this example, upper layers 751 may be built on top of the SDAP 747, and may include a user datagram protocol (UDP) and IP security layer (UDP/IP) 752, a General Packet Radio Service (GPRS) Tunneling Protocol for the user plane layer (GTP-U) 753, and a User Plane PDU layer (UP PDU) 763.

The transport network layer 754 (also referred to as a "transport layer") may be built on IP transport, and the GTP-U 753 may be used on top of the UDP/IP layer 752 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 753 may be used for carrying user data within the GPRS core network and between the radio access network and the core network. The user data transported can be packets in any of IPv4, IPv6, or PPP formats, for example. The UDP/IP 752 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer (e.g., PHY 710), an L2 layer (e.g., MAC 720, RLC 730, PDCP 740, and/or SDAP 747), the UDP/IP layer 752, and the GTP-U 753. The S-GW 222 and the P-GW 223 may utilize an S5/S8a interface to exchange user plane data via a protocol stack comprising an L1 layer, an L2 layer, the UDP/IP layer 752, and the GTP-U 753. As discussed previously, NAS protocols may support the mobility of the UE 101 and the session management procedures to establish and maintain IP connectivity between the UE 101 and the P-GW 223.

Moreover, although not shown by FIG. 7, an application layer may be present above the AP 763 and/or the transport network layer 754. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 610. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 8:
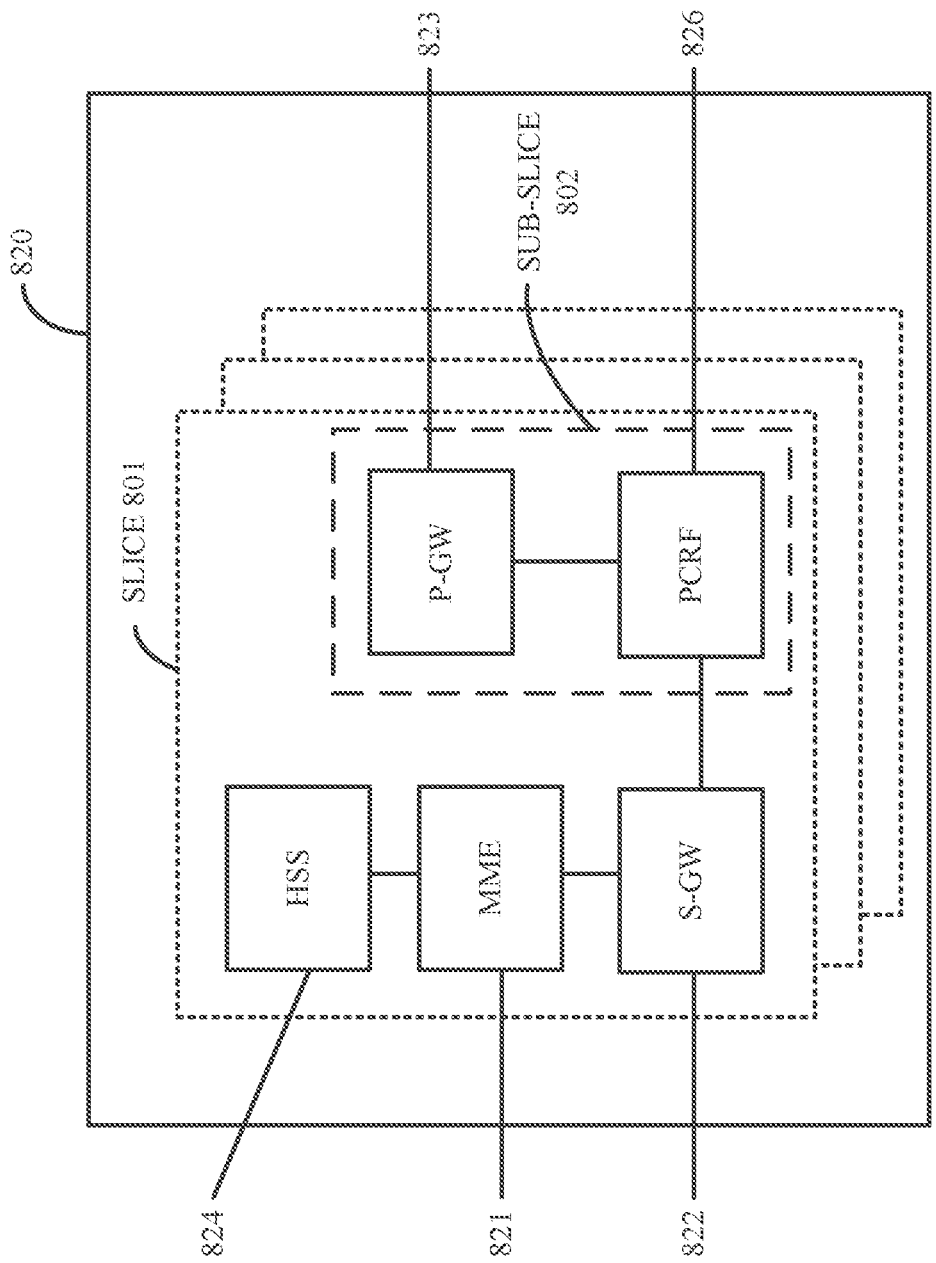
FIG. 8 illustrates components of a core network.

FIG. 8 illustrates components of a core network, according to some implementations of the present disclosure. The components of the CN 220 may be implemented in one physical node or separate physical nodes including components to read and execute instructions from a machine-readable or computer-readable medium (e.g., a non-transitory machine-readable storage medium). In implementations, the components of CN 320 may be implemented in a same or similar manner as discussed herein with regard to the components of CN 220. In some implementations, NFV is utilized to virtualize any or all of the above-described network node functions via executable instructions stored in one or more computer-readable storage mediums (described in further detail below). A logical instantiation of the CN 220 may be referred to as a network slice 801, and individual logical instantiations of the CN 220 may provide specific network capabilities and network characteristics. A logical instantiation of a portion of the CN 220 may be referred to as a network sub-slice 802 (e.g., the network sub-slice 802 is shown to include the P-GW 223 and the PCRF 226).

As used herein, the terms "instantiate," "instantiation," and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to a set of network functions (NFs) instances and the resources (e.g., compute, storage, and networking resources) required to deploy the network slice.

With respect to 5G systems (see, e.g., FIG. 3), a network slice always comprises a RAN part and a CN part. The support of network slicing relies on the principle that traffic for different slices is handled by different PDU sessions. The network can realize the different network slices by scheduling and also by providing different L1/L2 configurations. The UE 301 provides assistance information for network slice selection in an appropriate RRC message, if it has been provided by NAS. While the network can support large number of slices, the UE need not support more than 8 slices simultaneously.

A network slice may include the CN 320 control plane and user plane NFs, NG-RANs 310 in a serving PLMN, and a N3IWF functions in the serving PLMN. Individual network slices may have different S-NSSAI and/or may have different SSTs. NSSAI includes one or more S-NSSAIs, and each network slice is uniquely identified by an S-NSSAI. Network slices may differ for supported features and network functions optimizations, and/or multiple network slice instances may deliver the same service/features but for different groups of UEs 301 (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G AN and associated with eight different S-NSSAIs. Moreover, an AMF 321 instance serving an individual UE 301 may belong to each of the network slice instances serving that UE.

Network Slicing in the NG-RAN 310 involves RAN slice awareness. RAN slice awareness includes differentiated handling of traffic for different network slices, which have been pre-configured. Slice awareness in the NG-RAN 310 is introduced at the PDU session level by indicating the S-NSSAI corresponding to a PDU session in all signaling that includes PDU session resource information. How the NG-RAN 310 supports the slice enabling in terms of NG-RAN functions (e.g., the set of network functions that comprise each slice) is implementation dependent. The NG-RAN 310 selects the RAN part of the network slice using assistance information provided by the UE 301 or the 5GC 320, which unambiguously identifies one or more of the pre-configured network slices in the PLMN. The NG-RAN 310 also supports resource management and policy enforcement between slices as per SLAs. A single NG-RAN node may support multiple slices, and the NG-RAN 310 may also apply an appropriate RRM policy for the SLA in place to each supported slice. The NG-RAN 310 may also support QoS differentiation within a slice.

The NG-RAN 310 may also use the UE assistance information for the selection of an AMF 321 during an initial attach, if available. The NG-RAN 310 uses the assistance information for routing the initial NAS to an AMF 321. If the NG-RAN 310 is unable to select an AMF 321 using the assistance information, or the UE 301 does not provide any such information, the NG-RAN 310 sends the NAS signaling to a default AMF 321, which may be among a pool of AMFs 321. For subsequent accesses, the UE 301 provides a temp ID, which is assigned to the UE 301 by the 5GC 320, to enable the NG-RAN 310 to route the NAS message to the appropriate AMF 321 as long as the temp ID is valid. The NG-RAN 310 is aware of, and can reach, the AMF 321 that is associated with the temp ID. Otherwise, the method for initial attach applies.

The NG-RAN 310 supports resource isolation between slices. NG-RAN 310 resource isolation may be achieved by means of RRM policies and protection mechanisms that should avoid that shortage of shared resources if one slice breaks the service level agreement for another slice. In some implementations, it is possible to fully dedicate NG-RAN 310 resources to a certain slice. How NG-RAN 310 supports resource isolation is implementation dependent.

Some slices may be available only in part of the network. Awareness in the NG-RAN 310 of the slices supported in the cells of its neighbors may be beneficial for inter-frequency mobility in connected mode. The slice availability may not change within the UE's registration area. The NG-RAN 310 and the 5GC 320 are responsible to handle a service request for a slice that may or may not be available in a given area. Admission or rejection of access to a slice may depend on factors such as support for the slice, availability of resources, support of the requested service by NG-RAN 310.

The UE 301 may be associated with multiple network slices simultaneously. In case the UE 301 is associated with multiple slices simultaneously, only one signaling connection is maintained, and for intra-frequency cell reselection, the UE 301 tries to camp on the best cell. For inter-frequency cell reselection, dedicated priorities can be used to control the frequency on which the UE 301 camps. The 5GC 320 is to validate that the UE 301 has the rights to access a network slice. Prior to receiving an Initial Context Setup Request message, the NG-RAN 310 may be allowed to apply some provisional/local policies, based on awareness of a particular slice that the UE 301 is requesting to access During the initial context setup, the NG-RAN 310 is informed of the slice for which resources are being requested.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 9:
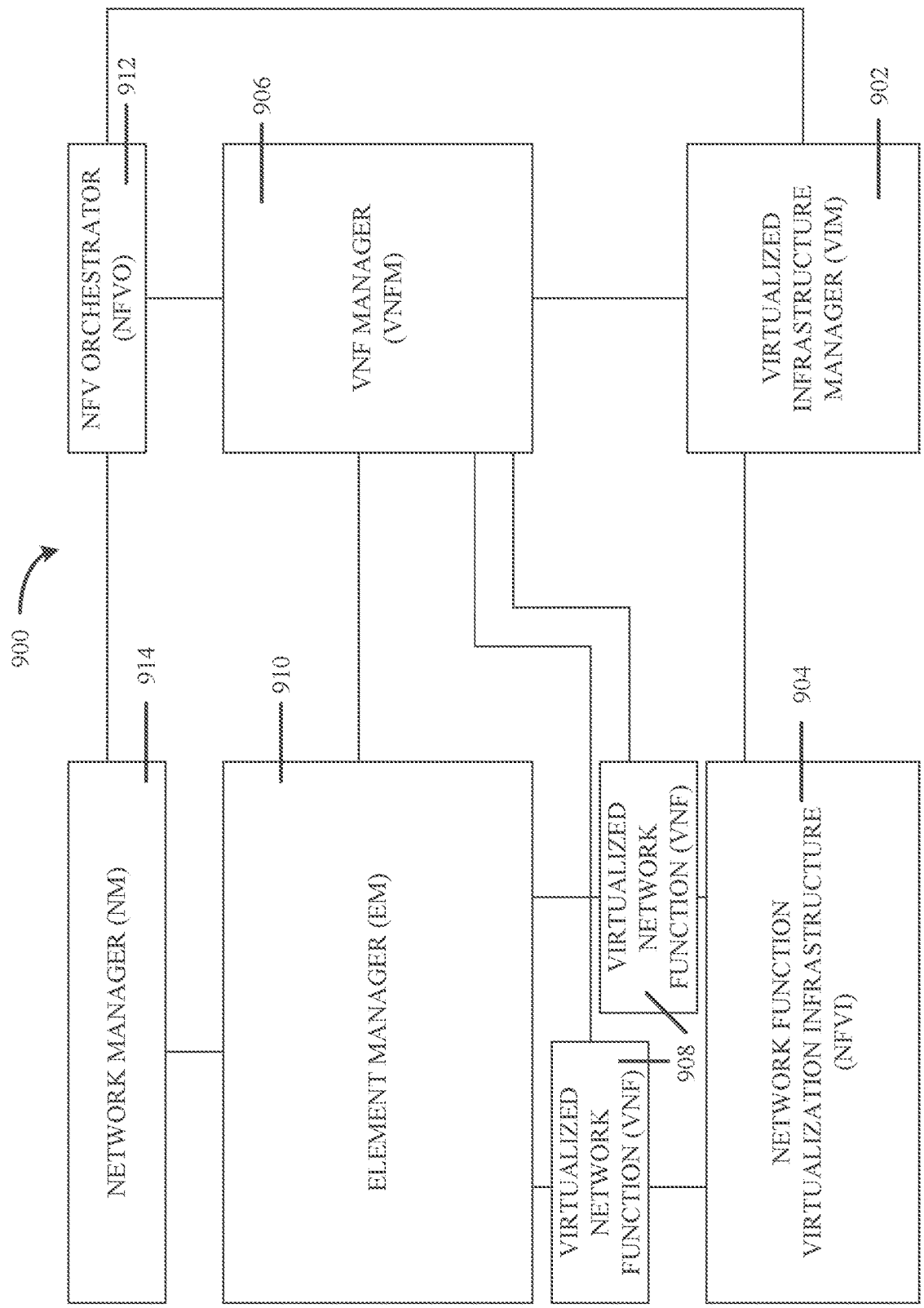
FIG. 9 is a block diagram illustrating components of a system to support NFV.

FIG. 9 is a block diagram illustrating components, according to some implementations of the present disclosure, of a system 900 to support NFV. The system 900 is illustrated as including a VIM 902, an NFVI 904, an VNFM 906, VNFs 908, an EM 910, an NFVO 912, and a NM 914.

The VIM 902 manages the resources of the NFVI 904. The NFVI 904 can include physical or virtual resources and applications (including hypervisors) used to execute the system 900. The VIM 902 may manage the life cycle of virtual resources with the NFVI 904 (e.g., creation, maintenance, and tear down of VMs associated with one or more physical resources), track VM instances, track performance, fault and security of VM instances and associated physical resources, and expose VM instances and associated physical resources to other management systems.

The VNFM 906 may manage the VNFs 908. The VNFs 908 may be used to execute EPC components/functions. The VNFM 906 may manage the life cycle of the VNFs 908 and track performance, fault and security of the virtual aspects of VNFs 908. The EM 910 may track the performance, fault and security of the functional aspects of VNFs 908. The tracking data from the VNFM 906 and the EM 910 may comprise, for example, PM data used by the VIM 902 or the NFVI 904. Both the VNFM 906 and the EM 910 can scale up/down the quantity of VNFs of the system 900.

The NFVO 912 may coordinate, authorize, release and engage resources of the NFVI 904 in order to provide the requested service (e.g., to execute an EPC function, component, or slice). The NM 914 may provide a package of end-user functions with the responsibility for the management of a network, which may include network elements with VNFs, non-virtualized network functions, or both (management of the VNFs may occur via the EM 910).

Figure 10:
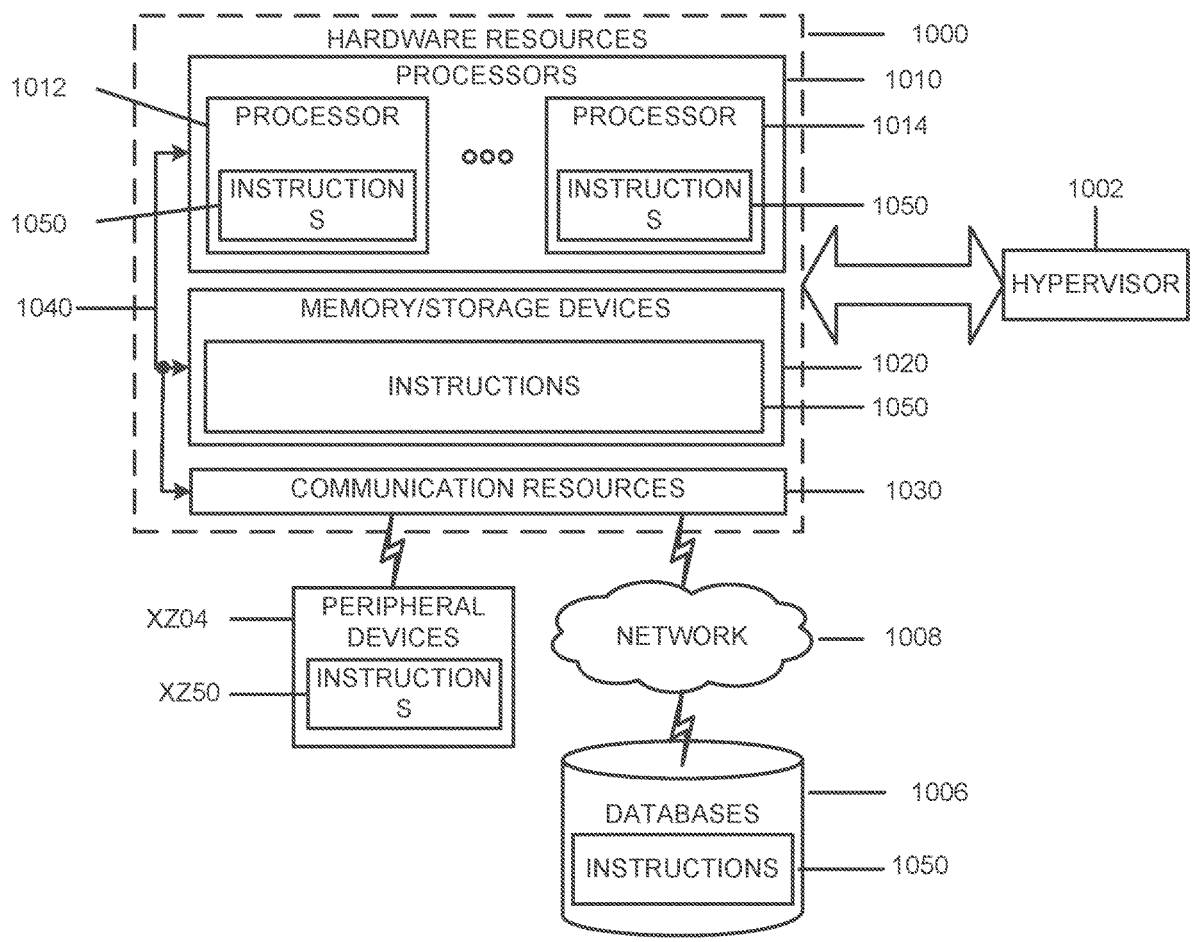
FIG. 10 is a block diagram illustrating components able to read instructions from a machine-readable or computer-readable medium (e.g., a non-transitory machine-readable storage medium) and perform any one or more of the methodologies discussed herein.

FIG. 10 is a block diagram illustrating components able to read instructions from a machine-readable or computer-readable medium (e.g., a non-transitory machine-readable storage medium) and perform any one or more of the methodologies discussed herein, according to some implementations of the present disclosure. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For implementations where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

For one or more implementations, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 11:
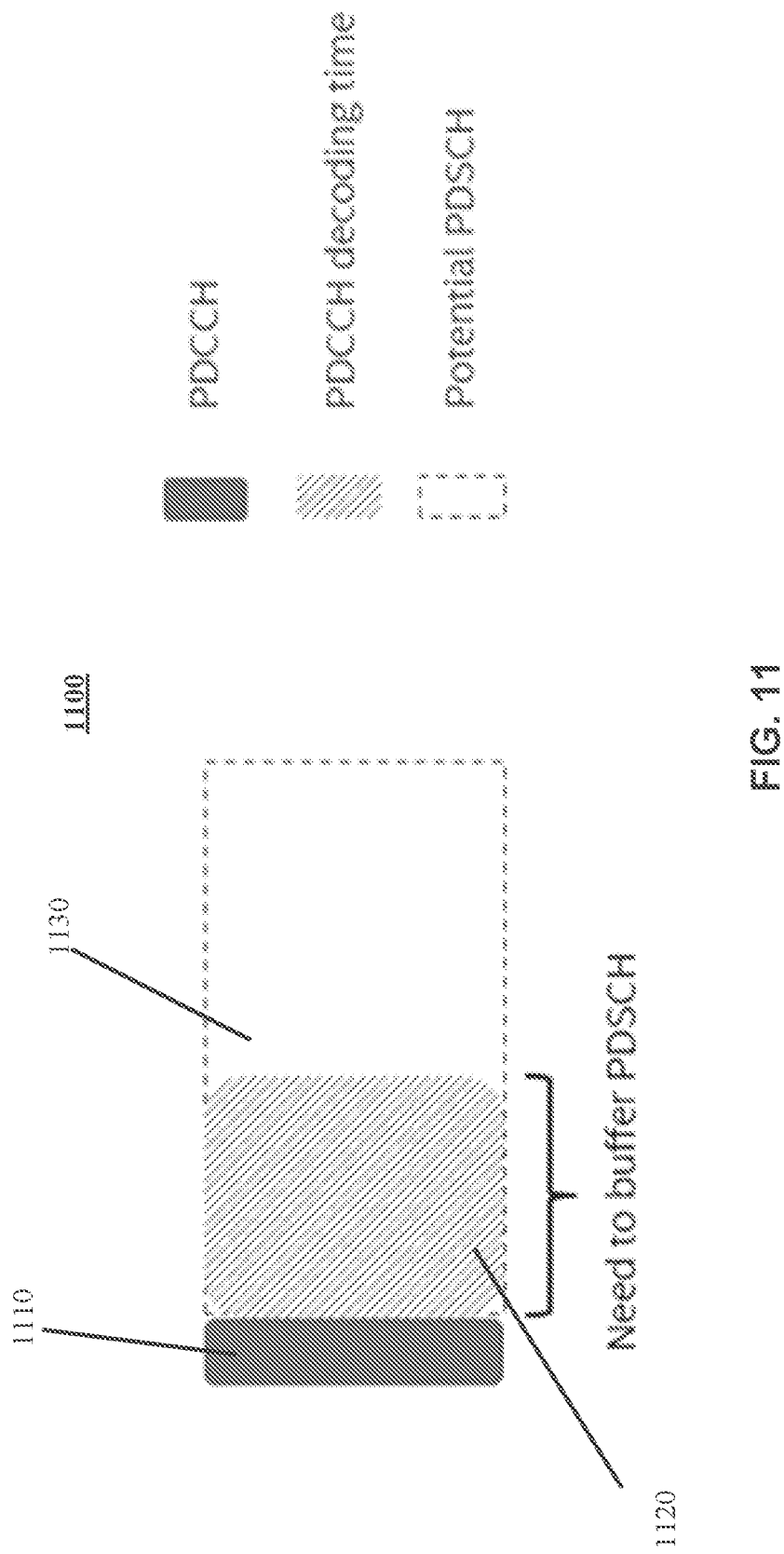
FIG. 11 is an illustration of that contextualizes how cross-slot scheduling can achieve power savings in UE.

FIG. 11 is an illustration of that contextualizes how cross-slot scheduling can achieve power savings in UE. As illustrated in FIG. 1, without limiting the scheduling scheme, the UE can receive a PDCCH message 1110. After receipt of the PDCCH, the UE has to buffer 1120 a certain duration after PDCCH to support the case where there is potential PDSCH transmission 1130 that immediately follows the PDCCH (e.g., with same-slot scheduling). This is because UE is not aware of whether and when PDSCH is scheduled until UE decodes the PDCCH. In cases where there is no PDSCH scheduled when UE decodes the PDCCH, the UE still needs to keep RF and some baseband processing on for the unnecessary buffering, which increases the UE power consumption. Thus, if an access node, or other device of wireless network, can provide an indication to a UE that imparts knowledge of whether such PDSCH buffering is really needed or not before finishing the PDCCH decoding, UE can determine to forego PDSCH buffering 1120 and UE power consumption can be reduced. Thus use of cross-slot scheduling power saving techniques, where the scheduling slot offset k0 for downlink (DL) and/or k2 for uplink (UL) is greater than 0.

The present disclosure provides implementations for cross-slot scheduling power saving techniques for NR systems. The cross-slot scheduling power saving techniques for NR can include one or more of the following approaches: indication based on higher layer signaling, indication based on L1 signaling, and implicit indication.

Configuration and Capability

The support of the cross-slot scheduling power saving techniques described herein can be an optional UE capability. Alternatively, this feature can be mandatory for NR UEs such as Rel-16 NR UEs.

In some implementations, the cross-slot scheduling power saving technique can be activated or deactivated using higher layer signaling via cell-specific signaling such as system information or via UE-specific signaling such as UE-specific RRC message. In some implementations, the support of the cross-slot scheduling power saving technique can be configured together with power saving signal or channel feature. For example, the cross-slot scheduling power saving technique can be enabled when the power saving signal or channel feature is activated. In some implementations, the support of cross-slot scheduling and the preferred values for respective scheduling timing may be first reported by UE to gNB as part of UE capability, which can include PDSCH scheduling timing k0, PUSCH scheduling timing k2, PUCCH timing k1, aperiodic CSI-RS offset and CSI report timing, or a combination of some of them. In some implementations, UE may report a timing threshold to network to be used for the cross-slot scheduling timing setting.

In implementations, the cross-slot scheduling, if activated or enabled, is only applied for unicast scheduling, for example, the DCI CRC is scrambled with C-RNTI in UE-specific search space (USS). For broadcast PDSCH transmission (e.g., DCI CRC scrambled with ST-RNTT, RA-RNTT, P-RNTT etc.), the same slot scheduling may be still applied even though cross-slot scheduling has been enabled by network.

A previously noted, there may be three alternatives for activating the cross-slot scheduling power saving techniques, including: indication based on higher layer signaling, indication based on MAC control element (CE), indication based on L1 signaling, and implicit indication.

Indication Based on Higher Laver Signaling or MAC CE Signaling

In some implementations, the current method of Time Domain Resource Allocation (TDRA) table configuration in Rel-15 NR may be reused. In particular, a table for PDSCH and/or PUSCH can be configured by the higher layer signaling, which provides a list of the slot offset k0 and/or k2, and the Start and Length Indicator (SLIV). The configured time domain resource assignments in the TDRA table such as with k0 and/or k2 being greater than 0 allows the UE to reduce the PDCCH processing and/or to switch to micro sleep after the PDCCH reception. This table can be a separate TDRA table from the one used for regular PDSCH/PUSCH scheduling without any restriction. The use of the separate TDRA table for cross-slot scheduling power saving technique can be activated or deactivated by the higher layer signaling. In this implementation, the latency will be increased due to the duration needed for the re-configuration via higher layer signaling.

Figure 12:
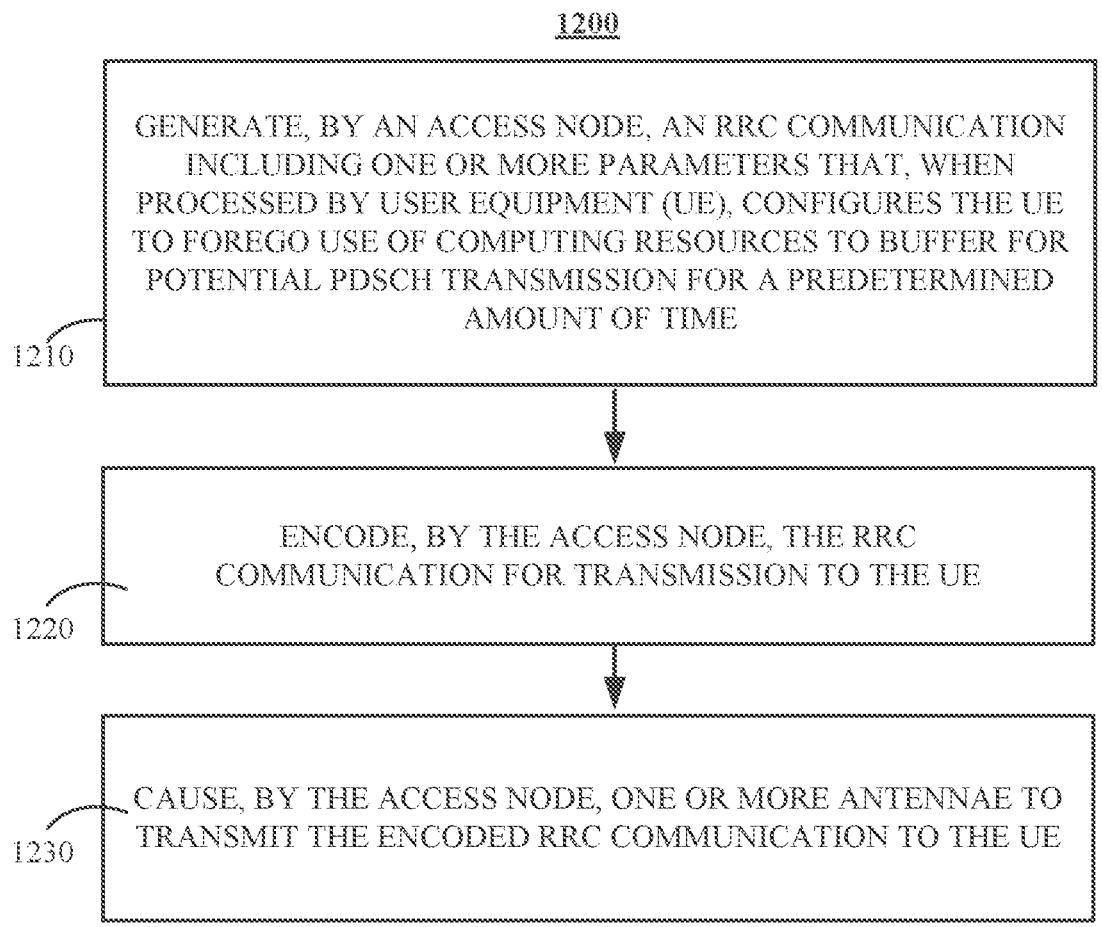
FIG. 12 is a flowchart of an example of a process for using RRC signaling to activate cross-slot scheduling in user equipment (UE) to achieve power savings.

FIG. 12 is a flowchart of an example of a process 1200 for using RRC signaling to activate cross-slot scheduling in user equipment (UE) to achieve power savings. In general, the process 1200 can include generating, by an access node, an RRC communication including one or more parameters that, when processed by the UE, configures the UE to forego use of computing resources to buffer for potential PDSCH transmission for a predetermined amount of time (1210), encoding, by the access node, the RRC communication for transmission to the UE (1220), and causing, by the access node, one or more antennae to transmit the encoded RRC communication to the UE (1230). For convenience, the process 1200 will be described in more detail as being performed by an access node such as an eNodeB described with respect to system 100 of FIG. 1.

The access node can begin performance of the process 1200 by generating an RRC communication including one or more parameters that, when processed by the UE, configures the UE to forego allocation or use of computing resources to buffer for potential PDSCH transmission for a predetermined amount of time (1210). Generating the RRC communication can include, for example, generating fields of a message, data in the fields of the message, or both, that can be conveyed using the RRC signaling to a UE to activate cross-slot scheduling.

In some implementations, the one or more parameters of the RRC communication can include data that can be used to configure a time domain resource allocation (TDRA) table. In some implementations, these parameters can be, for example, data including (i) a slot offset k0 that is greater than 0 or k2 that is greater than 0, (ii) a start and length indicator (SLIV) that can be used to configure a TDRA table, or both.

In some implementations, foregoing allocation or use of computing resources to buffer for potential PDSCH transmission for a predetermined amount of time includes causing the UE to switch to micro sleep mode after PDCCH reception. In some implementations, the predetermined amount of time can be a period of time while the PDCCH is being decoded. In some implementations, the predetermined amount of time can be based on a timer used by the UE. For example, the UE timer can be configured to count up to a predetermined time or count down from a predetermined time to zero. In either implementations, the UE can forgo allocation or use of a buffer, or other computing resources, to monitor for or receive PDSCH transmission until the counter has expired such as by counting down to zero or the counter has completed its count up such as by counting up to a predetermined time.

The access node can continue performance of the process 1200 by encoding the RRC communication for transmission to the UE (1220). In some implementations, the encoding can be performed by encoding circuitry of baseband circuitry using one or more of convolution, tail-biting convolution, turbo, Viterbi, or Low Density Parity Check (LDPC) encoder functionality.

The access node can complete performance of the process 1200 by causing one or more antennae to transmit the encoded RRC communication to the UE (1230).

Figure 13:
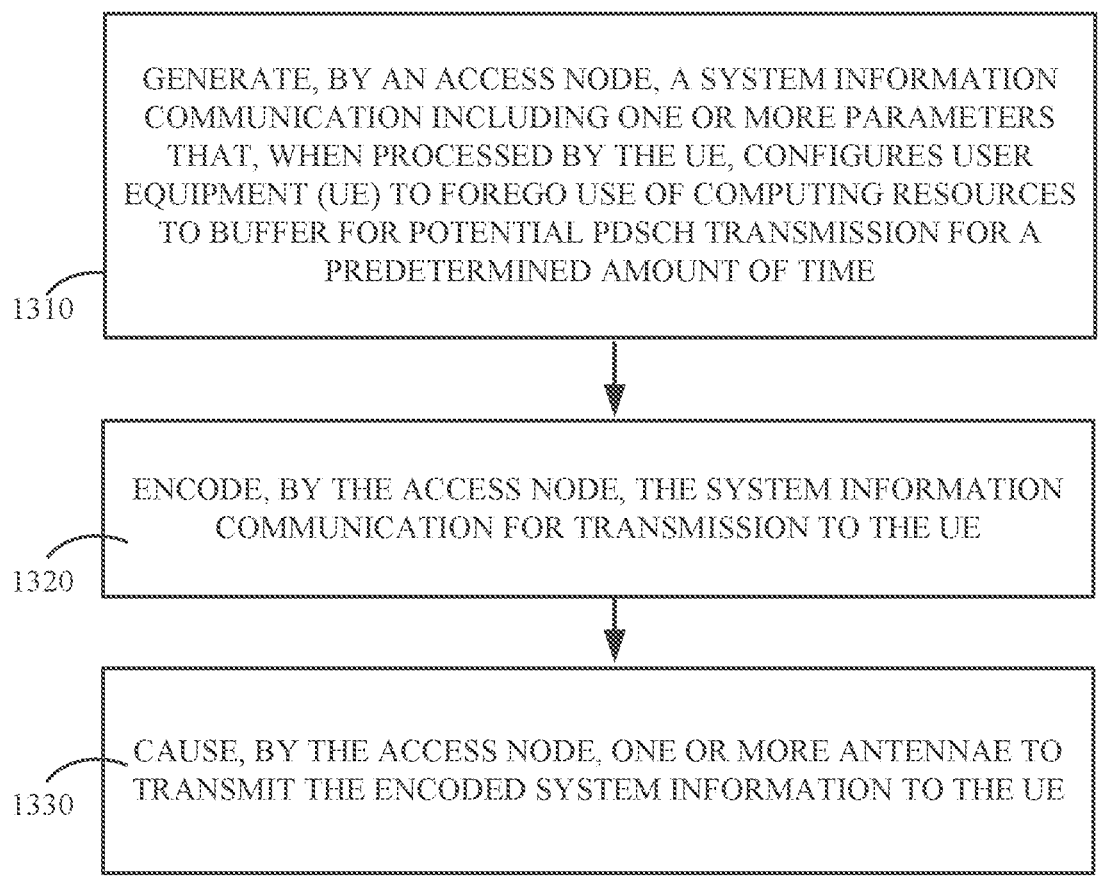
FIG. 13 is a flowchart of an example of a process for using system information for activating cross-slot scheduling in UE to achieve power savings.

FIG. 13 is a flowchart of an example of a process 1300 for using system information for activating cross-slot scheduling in UE to achieve power savings. In general, the process 1300 can include generating, by an access node, a system information communication including one or more parameters that, when processed by the UE, configures the UE to forego use of computing resources to buffer for potential PDSCH transmission for a predetermined amount of time (1310), encoding, by the access node, the system information communication for transmission to the UE (1320), and causing, by the access node, one or more antennae to transmit the encoded system information communication to the UE (1330). For convenience, the process 1300 will be described in more detail as being performed by an access node such as an eNodeB described with respect to system 100 of FIG. 1.

The access node can begin performance of the process 1300 by generating a system information communication including one or more parameters that, when processed by the UE, configures the UE to forego use of computing resources to buffer for potential PDSCH transmission for a predetermined amount of time (1310). Generating the system information communication can include, for example, generating fields of a message, data in the fields of the message, or both, that can be conveyed using the system information signaling to a UE to activate cross-slot scheduling.

In some implementations, the one or more parameters of the system information communication can include data that can be used to configure a time domain resource allocation (TDRA) table. In some implementations, these parameters can be, for example, data including (i) a slot offset k0 that is greater than 0 or k2 that is greater than 0, (ii) a start and length indicator (SLIV) that can be used to configure a TDRA table, or both.

In some implementations, foregoing allocation or use of computing resources to buffer for potential PDSCH transmission for a predetermined amount of time includes causing the UE to switch to micro sleep mode after PDCCH reception. In some implementations, the predetermined amount of time can be a period of time while the PDCCH is being decoded. In some implementations, the predetermined amount of time can be based on a timer used by the UE. For example, the UE timer can be configured to count up to a predetermined time or count down from a predetermined time to zero. In either implementations, the UE can forgo allocation or use of a buffer, or other computing resources, to monitor for or receive PDSCH transmission until the counter has expired such as by counting down to zero or the counter has completed its count up such as by counting up to a predetermined time.

The access node can continue performance of the process 1300 by encoding the system information communication for transmission to the UE (1320). In some implementations, the encoding can be performed by encoding circuitry of baseband circuitry using one or more of convolution, tail-biting convolution, turbo, Viterbi, or Low Density Parity Check (LDPC) encoder functionality.

The access node can complete performance of the process 1300 by causing one or more antennae to transmit the system information communication to the UE (1330).

Alternatively, a new MAC control element (CE) may be introduced to facilitate switching these same-slot and cross-slot TDRA tables. This MAC CE is identified by a MAC PDU sub header with a dedicated LCID. It has fixed size (e.g., four octets) to indicate the cross-slot scheduling is activated or not. An example of this MAC control element (CE) that can be used to activate cross-slot scheduling in UEs to achieve power savings is shown as MAC CE 1400 in FIG. 14. In the example of FIG. 14, the cross-slot activation/deactivation MAC CE of four octets.

In FIG. 14, the MAC CE includes bits Ci such as bit $C_3$ 1410. In this example, if there is an SCell configured for the MAC entity with SCellIndex i as specified in 3GPP TS 38.331, this field indicates the activation or deactivation status of the cross-slot scheduling on the SCell with SCellIndex i, else the MAC entity shall ignore the Ci field. The Ci field is set to "1" to indicate that the cross-slot scheduling on the SCell with SCellIndex i shall be activated. The Ci field is set to "0" to indicate that cross-slot scheduling on the SCell with SCellIndex i shall be deactivated.

In some implementations, one bit Ci may be used to activate or deactivate cross-slot scheduling for all CCs within a CC group (CG) i to reduce the MAC CE overhead With this approach, the 4 Octet MAC CE may be reduced to 1 octet MAC CE.

In some implementations, the UE can be configured with a timer such as a cross-slot-scheduling-inactivity-timer, which if running, UE would assume DCI schedules data with K0>0. In one example, at the start of DRX ON, the timer can start and can be terminated based on L1 signaling or MAC CE. In another example, upon sleeping for a given duration or skipping PDCCH monitoring occasions for a given durations, the timer may start. In this example, when the UE wakes up from the sleep duration, the UE expects cross-slot scheduling for a configured duration.

Figure 15:
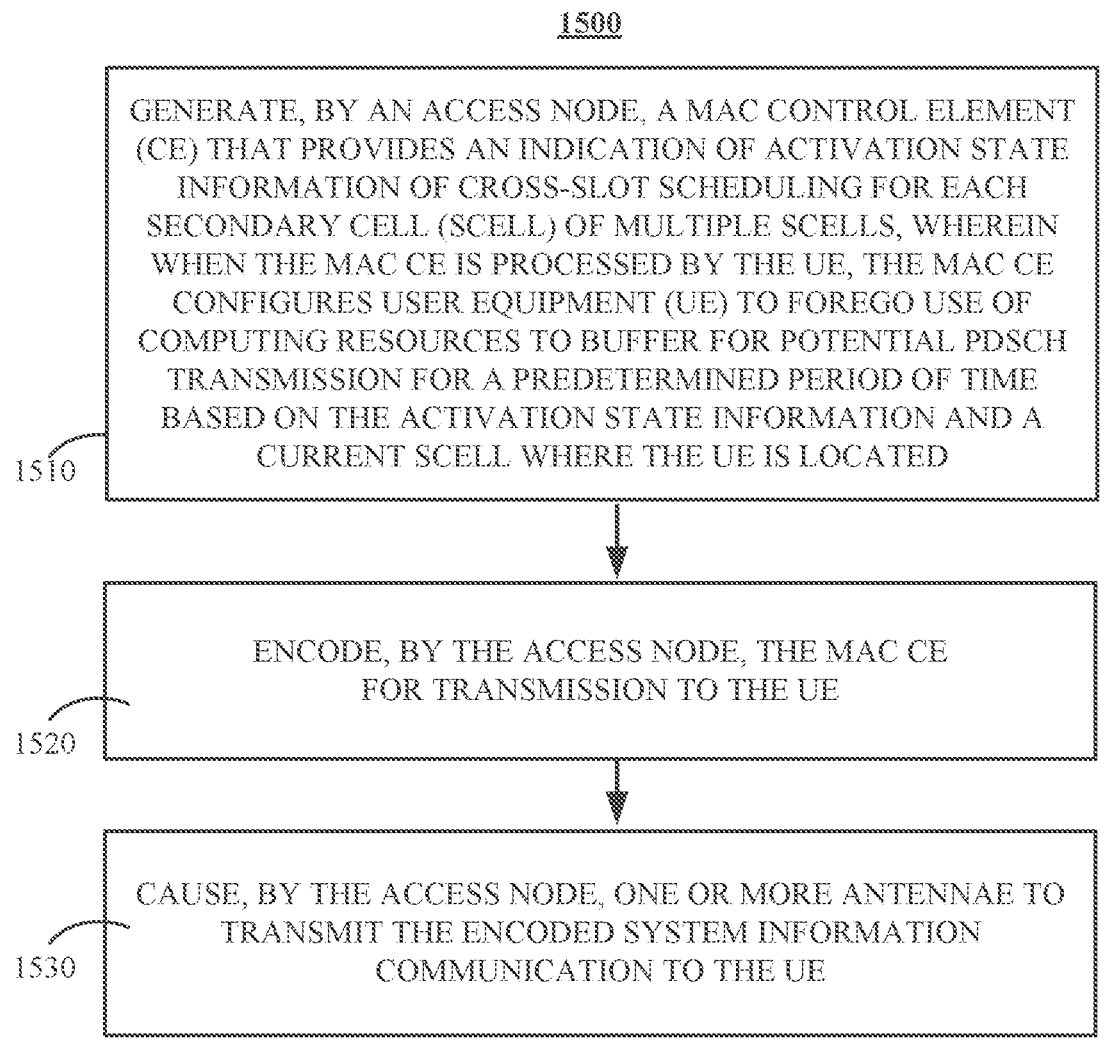
FIG. 15 is a flowchart of an example of a process for using a MAC CE to activate cross-slot scheduling in a UE to achieve power savings.

FIG. 15 is a flowchart of an example of a process 1500 for using a MAC CE to activate cross-slot scheduling in a UE to achieve power savings. In general, the process 1500 can include generating, by an access node, a MAC control element (CE) that provides an indication of activation state information of cross-slot scheduling for each secondary cell (SCell) of multiple SCells, wherein when the MAC CE is processed by the UE, the MAC CE configures the UE to forego use of computing resources to buffer for potential PDSCH transmission for a predetermined period of time based on the activation state information and a current SCell where the UE is located (1510), encoding, by the access node, the MAC CE for transmission to the UE (1520), and causing, by the access node, one or more antenna to transmit the encoded system information communication to the UE (1530). For convenience, the process 1500 will be described in more detail as being performed by an access node such as an eNodeB described with respect to system 100 of FIG. 1.

The access node can begin performance of the process 1500 by generating a MAC control element (CE) that provides an indication of activation state information of cross-slot scheduling for each secondary cell (SCell) of multiple SCells, wherein when the MAC CE is processed by the UE, the MAC CE configures the UE to forego use of computing resources to buffer for potential PDSCH transmission for a predetermined period of time based on the activation state information and a current SCell where the UE is located (1510). Generating the system information communication can include, for example, generating afield of the MAC CE for each SCell, generating state activate data in the fields of the MAC CE, or both, that can be conveyed using the MAC CE to a UE to activate cross-slot scheduling. The activation state information can indicate, for each particular SCell of the multiple SCells, whether cross-slot scheduling is activated or deactivated for the particular SCell.

In some implementations, foregoing allocation or use of computing resources to buffer for potential PDSCH transmission for a predetermined amount of time includes causing the UE to switch to micro sleep mode after PDCCH reception. In some implementations, configuring the UE to forego use of the computing resources to buffer for potential PDSCH transmission for a predetermined amount of time comprises assigning one or more fields of the TDRA table based on the activation state information of the MAC CE. In some implementations, the predetermined amount of time can be a period of time while the PDCCH is being decoded. In some implementations, the predetermined amount of time can be based on a timer used by the UE. For example, the UE timer can be configured to count up to a predetermined time or count down from a predetermined time to zero. In either implementations, the UE can forgo allocation or use of a buffer, or other computing resources, to monitor for or receive PDSCH transmission until the counter has expired such as by counting down to zero or the counter has completed its count up such as by counting up to a predetermined time.

In some implementations, the MAC CE size can be a fixed size and the MAC CE can include 4 octets. However, in other implementations, the size of the MAC CE can be reduced by using a MAC CE that includes only 1 octet to provide an indication of cross-slot activation or deactivation status. In such implementations, a one bit $C_i$ can be used to represent activation state information regarding cross-slot scheduling for all CC(s) within a carrier group (CG).

The access node can continue performance of the process 1500 by encoding the MAC CE for transmission to the UE (1520). In some implementations, the encoding can be performed by encoding circuitry of baseband circuitry using one or more of convolution, tail-biting convolution, turbo, Viterbi, or Low Density Parity Check (LDPC) encoder functionality.

The access node can complete performance of the process 1300 by causing one or more antennae to transmit the MAC CE to the UE (1530).

In another implementation, the UE can be configured with CC group 1 and CC group 2, where the UE expects cross-slot scheduling in CC group 2 but not in CC group 1. For example, CC group 1 can be PCell and CC group 2 can be SCell. This can be activated or deactivated based on L1 signaling, configured timer or MAC CE.

Indication Based On L1 Signaling

In some implementations, the indication of the cross-slot scheduling can be based on L1 signaling. Such implementations can provide a more dynamic approach for adaptation between same-slot and cross-slot scheduling, which leads to less latency. Examples of L1 signaling to provide indications of cross-slot scheduling are provided in more detail below.

In some implementations, a wake-up signal or channel can be used. Examples of how to indicate the cross-slot scheduling configuration via wake-up PDCCH are described in more detail in U.S. Provisional App. No. 62/826,818. In particular, a field in the wake-up PDCCH, either in common indication block or UE-specific indication block, can be used to indicate the cross-slot scheduling power saving techniques.

The indicated list of PDSCH and/or PUSCH time domain resource allocations (TDRA) can be applied to the BWP and/or the CC(s) to be woken up by the wake-up PDCCH, or alternatively applied to all the BWPs on the CC(s) to be waken up, or all BWPs and all CCs configured to the UE by the gNB through high layers.

In some implementations, the indicated list of PDSCH or PUSCH time domain allocations can be valid for the duration where UE is to be woken up by this wake-up PDCCH.

In some implementations, the indicated list of PDSCH or PUSCH time domain allocations can be valid for a certain duration, which can be determined by a timer. The timer may be configurable on a per UE basis. After a certain slot scheduling scheme such as same-slot scheduling or cross-slot scheduling is activated, the timer, if configured, can start or restart once a PDCCH with valid data scheduling is received. After the expiration of the timer, a default TDRA table such as the one configured for regular PDSCH or PUSCH scheduling as in Rel-15 NR can be used and UE stops the timer. The duration of the timer can be fixed in spec, or be configured by higher layer signaling such as a part of the configuration of cross-slot scheduling power saving feature. When the timer is infinity, it implies that the indicated list of PDSCH or PUSCH time domain allocations is always valid until another indication for the list of PDSCH or PUSCH time domain allocations is received.

In some implementations, the indicated list of PDSCH or PUSCH time domain allocations can be valid until another L1 signaling disable the use of this list. This implementation can be similar to the SPS activation or deactivation method, where one status of this field in the DCI indicates the disabling of this list, for example, falling back to a default TDRA table such as the TDRA table without any restriction.

Alternatively, the scheduling DCI can be further enhanced to activate or deactivate cross-slot scheduling. In some implementations, the existing DCI can be extended to include a field for the indication of cross-slot scheduling power saving feature.

In one implementations, the indicated list of PDSCH and/or PUSCH time domain resource allocations (TDRA) can be applied to the BWP carrying the scheduled DCI, or the BWP indicated by the DCI for data transmissions.

In some implementations, the indicated list of PDSCH or PUSCH TDRAs can be applied to all BWPs on the CC carrying the DCI.

In some implementations, the indicated list of PDSCH or PUSCH TDRAs can be applied to all BWPs on all CCs configured by the UE. In some designs, different BWPs may be configured with separate TDRA tables. As one example, one TDRA table of BWP 'A' may at least include items with same-slot scheduling and another TDRA table of BWP 'B' may include items with cross-slot scheduling, i.e. $k_0 > 0$. The switching between same-sot scheduling and cross-slot scheduling may be implicitly achieved by BWP switching operation from BWP 'A' to BWP 'B'.

In some implementations, a minimum scheduling delay, denoting as D, may be configured for a given UE by higher layers. The activation or deactivation of items in BWP-specific TDRA tables may be achieved by the activation or deactivation of this minimum scheduling delay "D", which can be signaled by the MAC-CE or the aforementioned L1 signaling (e.g., 1-bit field in the WUS signal, or GTS signal, or scheduling DCI). Once the minimum scheduling delay "D" is activated (e.g., the 1-bit IE is set to '1') for a UE, the items within the TDRA tables configured for BWPs of a CC are selectively activated on condition that the $K0 \geq D$, $K2 \geq D$ are met by these items. This value of D also define the CSI-RS offset i.e. $\Delta = D$.

For the valid duration of the indicated list of PDSCH or PUSCH time domain allocations, the design can be similar to the wake-up PDCCH alternatively above, where the methods disclosed in the last two sub-bullets can be applied to this embodiment. Note that the activation of the cross-slot scheduling TDRA table starts from the next scheduling DCI, not the DCI indicating the activation of this TDRA table.

In another implementation, the go-to-sleep signal/channel (GTS) can be used. Details of the design is elaborated below. Before discussing how to design the field, we first provide the alternatives regarding the applicability of this indication:

The indicated list of PDSCH or PUSCH time domain allocations can be applied to the BWP carrying the GTS. Alternatively, it can be applied to the BWP indicated by the GTS if there is such indication in GTS. In some implementations, it can be applied to all BWPs on the CC carrying the GTS. In some implementations, it can be applied to all BWPs on all CCs configured by the UE.

For the valid duration of the indicated list of PDSCH or PUSCH time domain allocations, the design can be similar to the wake-up PDCCH alternatively above, where the methods disclosed in the last two sub-bullets can be applied to this embodiment.

In some implementations, the timer can be configured by the higher layer signaling per UE basis.

In various implementations, the detailed indication is based on L1 signaling. In some implementations, the indication based on L1 signaling is a field with 1 bit, where the value of "1" indicates the use of the rows in the TDRA tables configured by higher layer with $k_0 > 0$ for PDSCH scheduling or $k_2 > 0$ for PUSCH scheduling, i.e. cross-slot scheduling; while, the value of "0" indicates to use all the rows in TDRA tables configured by higher layer without restriction. In other words, a subset of the rows in the TDRA tables configured by higher layer signaling are selected when this field is "1".

In some implementations, the indication based on L1 signaling is a field with 2 bits for indication of k0 and/or 3 bits for indication of k2.

In some implementations, multiple TDRA tables can be configured by the higher layer signaling. Denoting the number of TDRA tables by Nt, this field would have $\lceil \log_2(Nt) \rceil$ bits to select one of the TDRA table to be used.

For the above implementations, in one example, the indication would be applied to all configured CCs. Alternatively, the indication would be applied only to the CCs to be woken up by this wake-up PDCCH. In yet another example, denoting the number of bits in this field for the above embodiments by M, this field can be extended to be M*Nc bits, where Nc denotes the number of CCs (CC groups) With this example, each M bits are used for the indication of one CC (group) and the indication method follows above embodiments.

In this implementation, with one of the TDRA table being the TDRA table as configured in Rel-15 NR without scheduling restriction, the DCI indicating this TDRA table works the same as the disabling of the use of TDRA tables for cross-slot scheduling power saving technique.

Further details of WUS and GTS signal transmission, signaling details were considered in U.S. Provisional App. No. 62/732,466, U.S. Provisional App. No. 62/702,822, and U.S. Provisional App. No. 62/826,818, each of which are incorporated by reference in their entireties.

Figure 16:
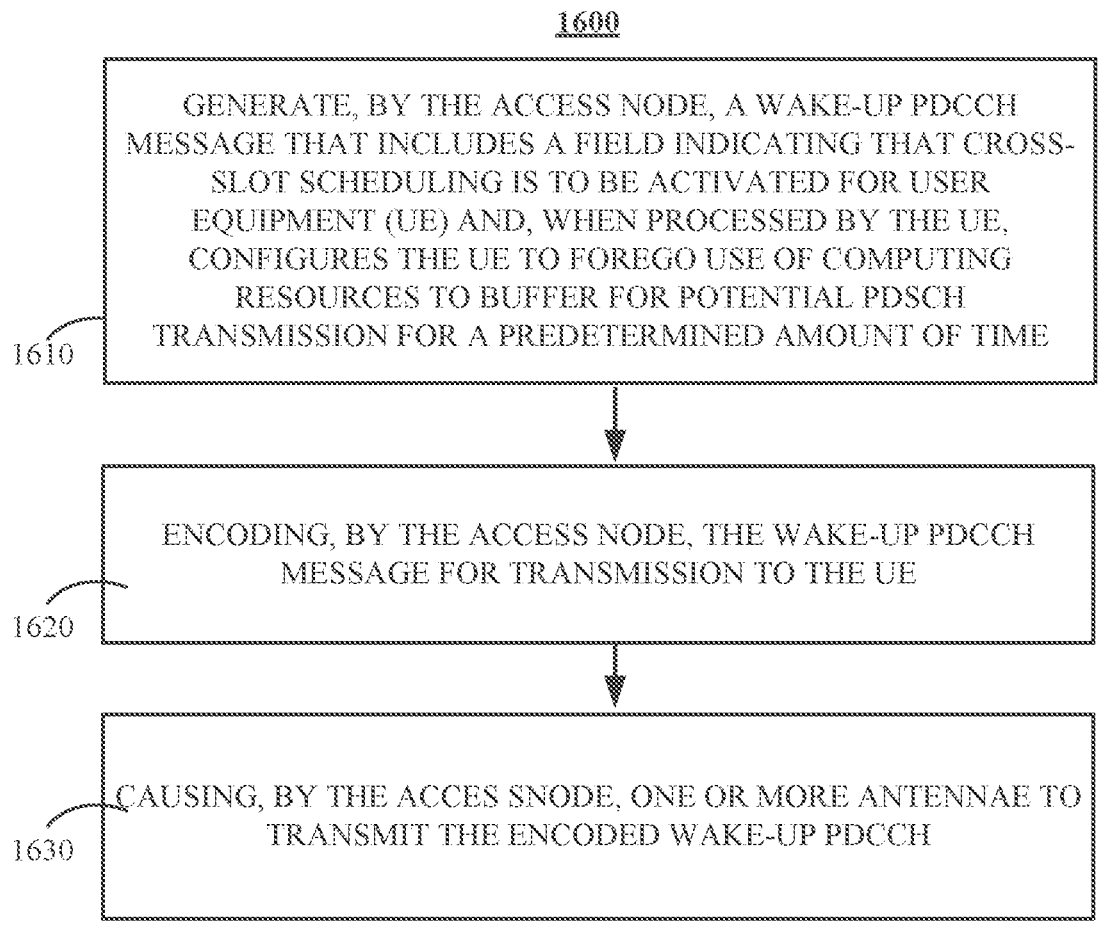
FIG. 16 is a flowchart of an example of a process for using L1 messaging to activate cross-slot scheduling in a UE to achieve power savings.

FIG. 16 is a flowchart of an example of a process 1600 for using L1 messaging to activate cross-slot scheduling in a UE to achieve power savings. In general, the process 1600 can include generating, by an access node, a wake-up PDCCH message that includes a field indicating that cross-slot scheduling is to be activated for the UE and, when processed by the UE, configures the UE to forego use of computing resources to buffer for potential PDSCH transmission for a predetermined amount of time (1610), encoding, by the access node, the wake-up PDCCH message for transmission to the UE (1620), and causing, by the access node, one or more antennae to transmit the encoded wake-up PDCCH message to the UE (1630). For convenience, the process 1600 will be described in more detail as being performed by an access node such as an eNodeB described with respect to system 100 of FIG. 1.

The access node can begin performance of the process 1600 by generating a wake-up PDCCH message that includes a field indicating that cross-slot scheduling is to be activated for the UE and, when processed by the UE, configures the UE to forego use of computing resources to buffer for potential PDSCH transmission for a predetermined amount of time (1610). Generating the wake-up PDCCH message can include, for example, generating fields of a message, data in the fields of the message, or both, that can be conveyed using the wake-up PDCCH message to a UE to activate cross-slot scheduling.

In some implementations, the one or more parameters of the wake-up PDCCH message can include data that can be used to configure a time domain resource allocation (TDRA) table. In some implementations, these parameters can be, for example, data including (i) a slot offset k0 that is greater than 0 or k2 that is greater than 0, (ii) a start and length indicator (SLIV) that can be used to configure a TDRA table, or both. In some implementations, data in the field of the wake-up PDCCH can applied to a BWP or the CC(s) to be woken up by the wake-up PDCCH.

In some implementations, foregoing allocation or use of computing resources to buffer for potential PDSCH transmission for a predetermined amount of time includes causing the UE to switch to micro sleep mode after PDCCH reception. In some implementations, the predetermined amount of time can be a period of time while the PDCCH is being decoded. In some implementations, the predetermined amount of time can be based on a timer used by the UE. For example, the UE timer can be configured to count up to a predetermined time or count down from a predetermined time to zero. In either implementations, the UE can forgo allocation or use of a buffer, or other computing resources, to monitor for or receive PDSCH transmission until the counter has expired such as by counting down to zero or the counter has completed its count up such as by counting up to a predetermined time.

The access node can continue performance of the process 1300 by encoding the wake-up PDCCH message for transmission to the UE (1320). In some implementations, the encoding can be performed by encoding circuitry of baseband circuitry using one or more of convolution, tail-biting convolution, turbo, Viterbi, or Low Density Parity Check (LDPC) encoder functionality.

The access node can complete performance of the process 1300 by causing one or more antennae to transmit the wake-up PDCCH message to the UE (1330).

Implicit Indication

In some implementations, a TDRA table with cross-slot scheduling (e.g., k0 and/or k2>0) can be configured by higher layer signaling. In addition, a TDRA table without scheduling restriction, which is configured the same as in Rel-15 NR, can be configured by higher layer signaling as well.

In some implementations, when the UE receives a GTS or WUS PDCCH, the TDRA table with cross-slot scheduling will be used/assumed by the UE for PDCCH monitoring when UE wakes up after the sleep. In one example of this embodiment, the UE will keep using/assuming the cross-slot scheduling TDRA table configured by the higher layer signaling, until UE receives a valid scheduling PDCCH. In another example, the UE will keep using the cross-slot scheduling TDRA table configured by the higher layer signaling, until a timer expires. The timer can be configured by higher layer signaling. In another example, the UE will keep using the cross-slot scheduling TDRA table configured by the higher layer signaling, until UE receives a scheduling PDCCH or timer expires, whichever comes first.

In some implementations, when the UE receives a wake-up signal/channel, the TDRA table with cross-slot scheduling will be used. Regarding how long this cross-scheduling TDRA table is valid, the above three examples described above for GTS can be applied to this embodiment.

In some implementations, when the UE can be configured with DRX cycle, the UE will use the cross-slot scheduling TDRA table starting from the on-duration. Regarding how long this cross-scheduling TDRA table is valid, the above three examples described above for GTS can be applied to this embodiment.

According to various implementations, the CSI-RS offset $\Delta>0$ may be assumed by the UE if cross-slot scheduling is activated for the active BWP on a given CC for PDSCH/PUSCH scheduling, wherein CSI-RS offset is defined as the slot delay for the CSI-RS relative to the triggering PDCCH. This may provide power savings since the UE otherwise cannot suspend the RF frontend and sampling buffer due to potential CSI-RS transmission.

Figure 17:
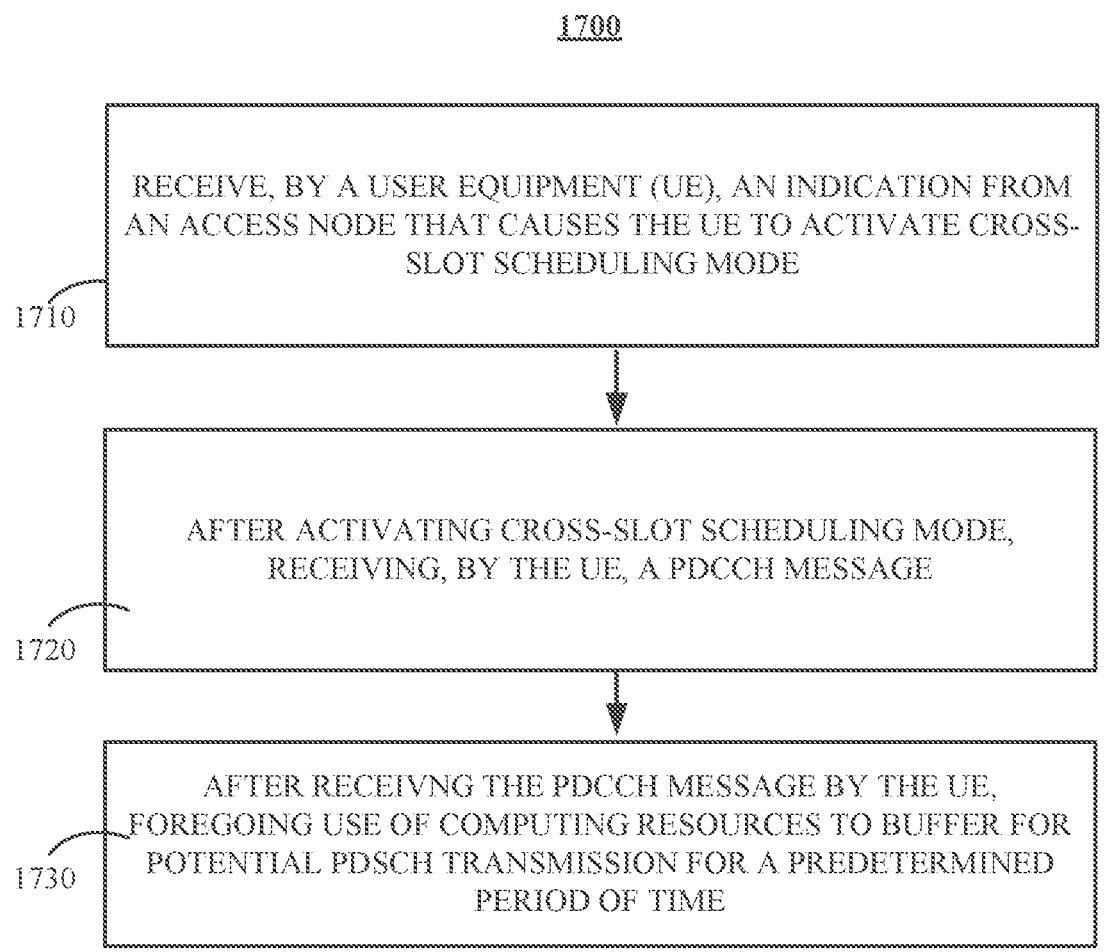
FIG. 17 is a flowchart of an example of a process performed by UE to use cross-slot scheduling to achieve power savings.

FIG. 17 is a flowchart of an example of a process 1700 performed by UE to use cross-slot scheduling to achieve power savings. In general, the process 1700 can include receiving, by the UE, an indication from an access node that causes the UE to activate cross-slot scheduling mode (1710), after activating cross-slot scheduling mode, receiving, by the UE, a PDCCH message (1720), and after receiving the PDCCH message by the UE, foregoing use of computing resources to buffer for potential PDSCH transmission for a predetermined period of time (1730). The process 1700 will be described in more detail as being performed by UE such as UE 101 of FIG. 1.

UE can begin performance of the process 1700 by receiving an indication from an access node that causes the UE to activate cross-slot scheduling mode (1710). In some implementations, the indication can include an RRC communication including one or more parameters that, when processed by the UE, configures the UE to forego use of computing resources to buffer for potential PDSCH transmission for a predetermined amount of time. In some implementations, the indication can include system information communication including one or more parameters that, when processed by the UE, configures the UE to forego use of computing resources to buffer for potential PDSCH transmission for a predetermined amount of time. In some implementations, the indication can include a MAC control element (CE) that provides an indication of activation state information of cross-slot scheduling for each secondary cell (SCell) of multiple SCells, wherein when the MAC CE is processed by the UE, the MAC CE configures the UE to forego use of computing resources to buffer for potential PDSCH transmission for a predetermined period of time based on the activation state information and a current SCell where the UE is located. In some implementations, the indication can include a wake-up PDCCH message that includes a field indicating that cross-slot scheduling is to be activated for the UE and, when processed by the UE, configures the UE to forego use of computing resources to buffer for potential PDSCH transmission for a predetermined amount of time.

In some implementations, the UE can forego allocation or use of computing resources to buffer for potential PDSCH transmission for a predetermined amount of time. In some implementations, this can include UE switching to micro sleep mode after PDCCH reception. In some implementations, the predetermined amount of time can be a period of time while the PDCCH is being decoded. In some implementations, the predetermined amount of time can be based on a timer used by the UE. For example, the UE timer can be configured to count up to a predetermined time or count down from a predetermined time to zero. In either implementations, the UE can forgo allocation or use of a buffer, or other computing resources, to monitor for or receive PDSCH transmission until the counter has expired such as by counting down to zero or the counter has completed its count up such as by counting up to a predetermined time. Then, upon a determination, by the UE, that counter has expired or that the counter has otherwise completed its count, the UE can allocate computing resources to monitor for potential PDSCH messages.

The IE can continue performance of the process 1700 after activating cross-slot scheduling mode, by receiving a PDCCH message (1720). In some implementations, upon receipt of the PDCCH message, the UE can begin decoding the PDCCH message.

The UE can continue performance of the process 1700 after receiving the PDCCH message, by foregoing use of computing resources to buffer for potential PDSCH transmission for a predetermined period of time (1730). In some implementations, the UE can enter into a micro sleep mode after receipt of the PDCCH message. In some implementations, the duration the UE remains in the micro sleep mode may be based, for example, on whether a UE countdown timer has expired or a countup timer has completed.

OTHER IMPLEMENTATIONS

A number of implementations have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other implementations are within the scope of the following claims.

The invention claimed is:

1. A method comprising:
  receiving first radio resource control (RRC) signaling that indicates one or more cross-slot scheduling parameters for a power saving mode of a user equipment (UE) that supports discontinuous reception (DRX) communications, the one or more cross-slot scheduling parameters comprising a slot offset between downlink control information (DCI) and a physical downlink shared channel (PDSCH) or physical uplink shared channel (PUSCH) transmission scheduled by the DCI;
  transmitting second RRC signaling that configures the UE with a time domain resource allocation (TDRA) parameter and one or more DRX parameters based at least in part on the one or more cross-slot scheduling parameters indicated by the first RRC signaling; and
  transmitting the DCI to the UE via a physical downlink control channel (PDCCH) during an active DRX time duration in accordance with the one or more DRX parameters, the DCI comprising a value associated with an element of the TDRA parameter configured by the second RRC signaling.

2. The method of claim 1, wherein the one or more DRX parameters configure the UE to refrain from monitoring for PDSCH transmissions for a predetermined amount of time which includes a period of time while the PDCCH is being decoded by the UE.

3. The method of claim 2, wherein the predetermined amount of time is defined by a timer of the UE.

4. The method of claim 1, wherein:
  the one or more cross-slot scheduling parameters of the first RRC signaling include data that can be used to configure the TDRA parameter; and
  the method further comprises assigning one or more fields of the TDRA parameter based on the one or more cross-slot scheduling parameters of the first RRC signaling.

5. The method of claim 1, wherein:
  the one or more cross-slot scheduling parameters of the first RRC signaling include a list of data including (i) a slot offset k0 that is greater than 0 or k2 that is greater than 0 and (ii) a start and length indicator (SLIV) that can be used to configure the TDRA parameter; and the method further comprises assigning one or more fields of the TDRA parameter based on the list of data included in the first RRC signaling.

6. The method of claim 1, wherein the first RRC signaling is received from the UE and the second RRC signaling is transmitted by an access node.

7. The method of claim 1, further comprising generating the first RRC signaling that includes the one or more cross-slot scheduling parameters that indicate the power saving mode to the UE in DRX communications for a predetermined amount of time.

8. The method of claim 1, wherein:
the TDRA parameter for the UE is valid for a time period; and
transmitting the DCI comprises transmitting, to the UE in a PDCCH, the DCI that encodes the TDRA parameter that is valid for the time period.

9. The method of claim 8, comprising:
transmitting a signal to the UE that indicates an end of the time period during which the TDRA parameter was valid to cause the UE to stop using the TDRA parameter.

10. The method of claim 8, wherein:
transmitting the DCI comprises transmitting, to the UE in a PDCCH, the DCI that encodes the TDRA parameter that is valid for the time period that causes the UE to use the TDRA parameter for the time period and use a default TDRA parameter when the time period expires.

11. The method of claim 1, wherein:
transmitting the DCI to the UE in the PDCCH causes the UE to use the TDRA parameter for another DCI received subsequent to the DCI and not the DCI.

12. The method of claim 1, wherein:
the TDRA parameter for the UE includes a bit that indicates whether the UE should use a first portion of the TDRA parameter for PDSCH scheduling and a second portion of the TDRA parameter for PUSCH scheduling; and
transmitting the DCI comprises transmitting, to the UE in a PDCCH, the DCI that encodes the TDRA parameter that includes the bit that indicates whether the UE should use a first portion of the TDRA parameter for PDSCH scheduling and a second portion of the TDRA parameter for PUSCH scheduling.

13. A processor comprising memory storing instructions that are operable, when executed by the processor, to cause the processor to perform operations comprising:
receiving first radio resource control (RRC) signaling that indicates one or more cross-slot scheduling parameters for a power saving mode of a user equipment (UE) that supports discontinuous reception (DRX) communications, the one or more cross-slot scheduling parameters comprising a slot offset between downlink control information (DCI) and a physical downlink shared channel (PDSCH) or physical uplink shared channel (PUSCH) transmission scheduled by the DCI;
transmitting second RRC signaling that configures the UE with a time domain resource allocation (TDRA) parameter and one or more DRX parameters based at least in part on the one or more cross-slot scheduling parameters indicated by the first RRC signaling; and
transmitting the DCI to the UE via a physical downlink control channel (PDCCH) during an active DRX time duration in accordance with the one or more DRX parameters, the DCI comprising a value associated with an element of the TDRA parameter configured by the second RRC signaling.

14. The processor of claim 13, wherein:
the one or more cross-slot scheduling parameters of the first RRC signaling include data that can be used to configure the TDRA parameter; and
the operations further comprise assigning one or more fields of the TDRA parameter based on the one or more cross-slot scheduling parameters of the first RRC signaling.

15. The processor of claim 13, wherein:
the one or more cross-slot scheduling parameters of the first RRC signaling include a list of data including (i) a slot offset k0 that is greater than 0 or k2 that is greater than 0 and (ii) a start and length indicator (SLIV) that can be used to configure the TDRA parameter; and
the operations further comprise assigning one or more fields of the TDRA parameter based on the list of data included in the first RRC signaling.

16. The processor of claim 13, wherein the first RRC signaling is received from the UE and the second RRC signaling is transmitted by an access node, the message.

17. An apparatus comprising:
one or more processors; and
memory storing instructions that are operable, when executed, to cause the one or more processors to perform operations comprising:
causing transmission of first radio resource control (RRC) signaling that indicates one or more cross-slot scheduling parameters for a power savings mode of a user equipment (UE) that supports discontinuous reception mode (DRX) communications, the one or more cross-slot scheduling parameters comprising a slot offset between downlink control information (DCI) and a physical downlink shared channel (PDSCH) or physical uplink shared channel (PUSCH) transmission scheduled by the DCI;
receiving second RRC signaling that configures the UE with a time domain resource allocation (TDRA) parameter and one or more DRX parameters based at least in part on the one or more cross-slot scheduling parameters indicated by the first RRC signaling; and
receiving the DCI via a physical downlink control channel (PDCCH) during an active DRX time duration in accordance with the one or more DRX parameters, the DCI comprising a value associated with an element of the TDRA parameter configured by the second RRC signaling.

18. The apparatus of claim 17, wherein the TDRA configuration for the UE is valid for a time period.

19. The apparatus of claim 18, wherein the operations further comprise receiving a signal that indicates an end of the time period during which the TDRA parameter was valid to cause the UE to stop using the TDRA configuration.

20. The apparatus of claim 17, wherein receiving the DCI causes the UE to use the TDRA configuration for another DCI received subsequent to the DCI and not the DCI.

* * * * *